(12) United States Patent
Ohba et al.

(10) Patent No.: US 7,064,753 B2
(45) Date of Patent: Jun. 20, 2006

(54) IMAGE GENERATING METHOD, STORAGE MEDIUM, IMAGE GENERATING APPARATUS, DATA SIGNAL AND PROGRAM

(75) Inventors: Yasuo Ohba, Yokohama (JP); Akinari Kaneko, Yokohama (JP); Hiroki Nagaoka, Yokohama (JP)

(73) Assignee: Namco Ltd., Tokyo (JP)

( * ) Notice: Subject to any disclaimer, the term of this patent is extended or adjusted under 35 U.S.C. 154(b) by 297 days.

(21) Appl. No.: 10/661,675

(22) Filed: Sep. 15, 2003

(65) Prior Publication Data

US 2004/0056859 A1    Mar. 25, 2004

(30) Foreign Application Priority Data

Sep. 19, 2002    (JP)    ............................. 2002-274155

(51) Int. Cl.
 *G06T 15/00*    (2006.01)
(52) U.S. Cl. ...................... 345/419; 345/426; 345/582
(58) Field of Classification Search ................ 345/419, 345/582, 426, 144, 581, 583
See application file for complete search history.

(56) References Cited

U.S. PATENT DOCUMENTS

| | | | |
|---|---|---|---|
| 5,947,819 A * | 9/1999 | Ohshima | ........................ 463/2 |
| 6,097,394 A * | 8/2000 | Levoy et al. | ................ 345/419 |
| 6,549,202 B1 | 4/2003 | Hasegawa et al. | |
| 6,603,874 B1 * | 8/2003 | Stern et al. | .................. 382/144 |
| 6,778,181 B1 * | 8/2004 | Kilgariff et al. | ............ 345/582 |
| 6,850,243 B1 * | 2/2005 | Kilgariff et al. | ............ 345/582 |

FOREIGN PATENT DOCUMENTS

| | | |
|---|---|---|
| JP | B1 2862080 | 12/1998 |
| JP | B2 3231029 | 9/2001 |
| JP | B2 3253020 | 11/2001 |

OTHER PUBLICATIONS

Takagi et al., "A Learning Support System for Beginners in Pencil Drawing," ACM, Oct. 2003, pp. 281-282.*
Haeberli et al., "The Accumulation Buffer: Hardware Support for High-quality Rendering," Computer Graphics (SIGGRAPH 1990 Proceedings), vol. 24, No. 4, pp. 309-318, Aug. 1990.*
Saeko Takagi; "Research Activities in Non-photorealistic Rendering", Technical Report of IEICE (HCS99-54 to 59, Human Communication Science); vol. 99, No. 385, pp. 1-6, Oct. 22, 1999.
Geoffrey Smith; (translated by Ken-ichirou Obana); "3D Texture Design"; SOFTBANK Publishing Inc., pp. 4-9, Jul. 2, 1999.

* cited by examiner

Primary Examiner—Phu K. Nguyen
(74) Attorney, Agent, or Firm—Oliff & Berridge, PLC

(57) ABSTRACT

An image generating method for producing a pictorial image at higher speed when a three-dimensional object is arranged in an object space. The image generating method has: operating a normal line to a surface of a three-dimensional object; setting a plurality of sampling points within a rendering region on which the three-dimensional object is projected on the basis of a predetermined viewpoint; and rendering the three-dimensional object by performing processing for determining an arrangement angle of a predetermined brush image on the basis of the normal line at a position on the surface of the three-dimensional object, corresponding to each of the plurality of sampling points, and arranging the predetermined brush image at the arrangement angle at the position corresponding to each of the plurality of sampling points in the rendering buffer.

22 Claims, 30 Drawing Sheets

| | | |
|---|---|---|
| | SAMPLING SETTING INFORMATION 714 | |
| 714a | OBJECT ID | DRAGON A |
| 714b | SAMPLING IMAGE | INTENSE NORMAL VECTOR IMAGE |
| 714c | SAMPLING TYPE | RANDOM |
| 714d | RANDOM PATTERN | RANDOM ii |
| 714e | SAMPLING CURVE | CURVE A |
| 714f | SAMPLING CURVE OFFSET QUANTITY | 3 |
| 714g | SAMPLING NUMBER | 100 |

FIG. 20

716 — RETOUCH SETTING INFORMATION

| | | |
|---|---|---|
| 716a | OBJECT ID | DRAGON A |
| 716b | USING BRUSH | brush_n11 |
| 716c | BRUSH SIZE | 100(%) |
| 716d | BRUSH ROLL | 60(°) |
| 716f | BRUSH MOVEMENT RANGE | 15(PIXELS) |
| 716e | BRUSH REPEAT NUMBER | 3 |
| 716g | RANDOM SETTING METHOD | EVERY FRAME |
| 716h | POSITION OFFSET RANGE | -5 ~ +5 (PIXELS) |
| 716j | POSITION OFFSET VARIATION | 2(PIXELS) |
| 716k | ROTATION OFFSET RANGE | -7 ~ +7 (°) |
| 716m | COLOR SAMPLING MATERIAL | PAINT IMAGE |
| 716n | COLOR SAMPLING CURVE | CURVE A |
| 716p | CURVE OFFSET | 3 |
| 716r | BRUSH COLOR | (R,G,B)=(112, 150, 250) |
| 716s | COLOR NUMBER | 256 |

746

746

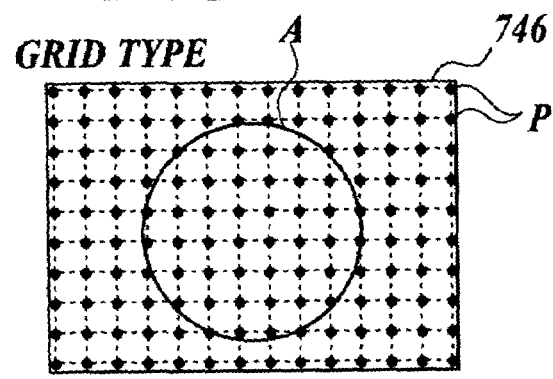
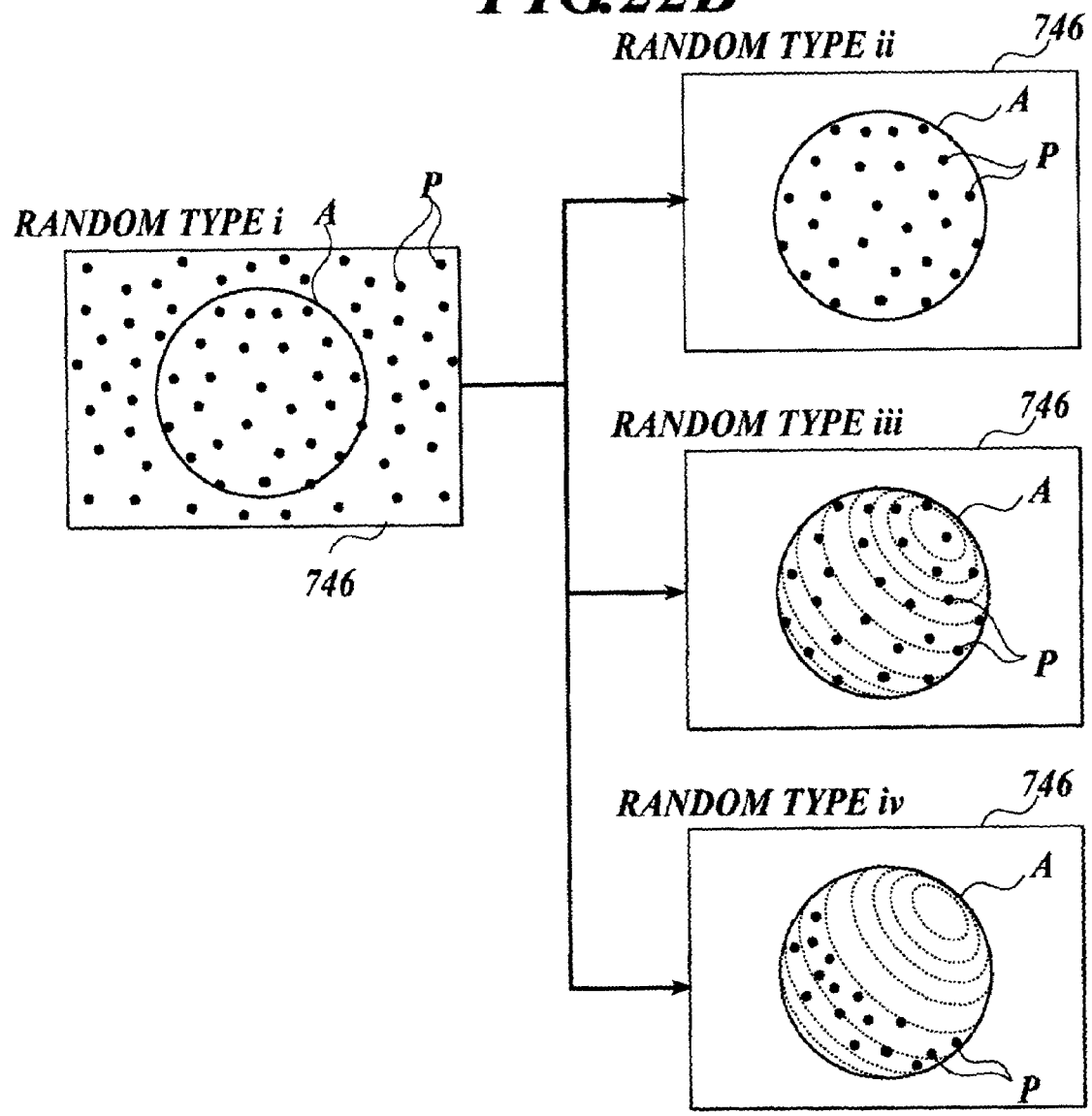

(OFFSET=0°)

(OFFSET=90°)

IMAGE GENERATING METHOD, STORAGE MEDIUM, IMAGE GENERATING APPARATUS, DATA SIGNAL AND PROGRAM

BACKGROUND OF THE INVENTION

1. Field of the Invention

The present invention relates to an image generating method and the like for rendering a three-dimensional object as seen from a given viewpoint by generating an image of the three-dimensional object and writing color information of the generated image into a rendering buffer.

2. Description of Related Art

Many recent techniques of computer graphics (hereinafter referred to as "CG" suitably) are for obtaining more realistic images, but various researches for obtaining pictorial images (hereinafter referred to "non-photorealistic rendering images (NPR images)" suitably) have been performed.

Technology development for obtaining especially cell animation style images among the pictorial images is vigorously performed. The cell animation style images are images having little gradation called as the so-called solid coating. However, full of expressions of characters can be represented by means of contours rimmed on monotonous coloring. As technologies for obtaining the cell animation style images, a technology for determining cell animation style coloring by utilizing the rendering processing of three-dimensional CG (for example, as disclosed in Japanese Patent Publication No. 3231029 corresponding to the U.S. Pat. No. 6,549,202), and a technology for generating contours (for example, as disclosed in Japanese Patent Publication No. 3253020) are known.

On the other hand, technology researches for generating handwriting style images such as oil paintings as pictorial images which are not the ones of the cell animation style, are being performed. As a technology for converting a photographic image taken on the spot to a handwriting style image, a technology for determining a shape of a touch (a brush image in the present application) by detecting edge intensity and an inclination of the edge by the use of an edge detection filter is known (for example, as disclosed in Japanese Patent Publication No. 2862080).

However, the cost (especially of time) related to image processing is enormous in the technology for generating a handwriting style image, and an effective technology for obtaining a handwriting style image for a shorter time is demanded accordingly. The technology disclosed in Japanese Patent Publication No. 2862080 also aims to obtain a handwriting style image for a shorter time. However, because the technology is for writing touches in edge directions detected by passing a photographic image taken on the spot through an edge detection filter, the technology can not always detect a contour accurately. Consequently, the phenomenon of the writing of touches in erroneous directions owing to the impossibleness of accurate extraction of a model part of the photographic image can occur.

In the three-dimensional CG, a three-dimensional object composed of a plurality of primitive surfaces (e.g. polygons) is arranged in an object space, and a two-dimensional image as seen from a given viewpoint is generated by performing the rendering of the object. Consequently, the contour parts or the like of the three-dimensional object can be specified in the coordinate system of the object space. Further, because the three-dimensional object is arranged in the object space in which the coordinate system is defined, the coordinates of a desired position can be accurately obtained by operation. Incidentally, these coordinate calculations cause a problem of being costly (especially in time). In particular, when an image is generated in real time (in the case where an image is generated at every frame) in a game machine or the like, the problem of costs (especially of time) is serious.

SUMMARY OF THE INVENTION

An object of the present invention is to produce a pictorial image at higher speed in case where a three-dimensional object is arranged in an object space.

In accordance with a first aspect of the present invention, an image generating method for rendering a three-dimensional object viewed from a predetermined viewpoint by generating an image of the three-dimensional object and writing color information on the image generated in a rendering buffer, comprises: operating a normal line to a surface of the three-dimensional object; setting a plurality of sampling points within a rendering region for the three-dimensional object, the rendering region on which the three-dimensional object is projected on the basis of the predetermined viewpoint; and rendering the three-dimensional object by performing processing for determining an arrangement angle of a predetermined brush image on the basis of the normal line operated at a position on the surface of the three-dimensional object, the position corresponding to each of the plurality of sampling points, and arranging the predetermined brush image at the arrangement angle determined at the position corresponding to each of the plurality of sampling points in the rendering buffer.

In accordance with a second aspect of the present invention, an image generating apparatus for rendering a three-dimensional object viewed from a predetermined viewpoint by generating an image of the three-dimensional object and writing color information on the image generated in a rendering buffer, comprises: a normal line operation section for operating a normal line to a surface of the three-dimensional object; a sampling point setting section for setting a plurality of sampling points within a rendering region for the three-dimensional object, the rendering region on which the three-dimensional object is projected on the basis of the predetermined viewpoint; and a rendering section for rendering the three-dimensional object by performing processing for determining an arrangement angle of a predetermined brush image on the basis of the normal line operated by the normal line operation section at a position on the surface of the three-dimensional object, the position corresponding to each of the plurality of sampling points, and arranging the predetermined brush image at the arrangement angle determined at the position corresponding to each of the plurality of sampling points in the rendering buffer.

Preferably, in the image generating method of the first aspect of the present invention, the operating a normal line to a surface of the three-dimensional object includes operating the normal line to the surface of the three-dimensional object by providing a first light source for emitting light rays in a first direction crossing at a right angle with an eyes line direction of the predetermined viewpoint and a second light source for emitting light rays in a second direction crossing at a right angle with the eyes line direction of the predetermined viewpoint, irradiating the light rays emitted from the first light source and the light rays emitted from the second light source to the three-dimensional object, executing predetermined rendering processing on the basis of the predetermined viewpoint, and generating a normal image expressing the normal line to the surface of the three-dimensional object in color information, the setting a plurality of sampling points includes setting the plurality of sampling points in the normal image generated, and the rendering the three-dimensional object includes rendering the three-dimensional object by performing the processing for determining the arrangement angle of the predetermined brush image on the basis of the color information of each of the plurality of sampling points, and arranging the predetermined brush image at the arrangement angle determined at the position corresponding to each of the plurality of sampling points in the rendering buffer.

Herein, in the present specification, the "rendering" means to write color information in the rendering buffer (for example, a frame buffer).

According to the image generating method, because the normal image generated is an image expressing the normal line to the surface of the three-dimensional object in color information, for example, it is possible to realize the rendering of the three-dimensional object simply by arranging the brush image at the arrangement angle along the surface of the three-dimensional object. More specifically, because the light rays emitted from the fist light source and the second light source are irradiated to the three-dimensional object in two directions crossing at right angles with the eyes line direction, the color information on the surface of the three-dimensional object which is expressed by the light rays in the two directions becomes information corresponding to the normal line as it is. That is, when the three-dimensional object is seen from the viewpoint, the angle of the surface of the three-dimensional object to the first direction can be estimate on the basis of the color information on the light rays of the first light source, and the angle of the surface of the three-dimensional object to the second direction can be estimate on the basis of the color information on the light rays of the second light source. Consequently, the normal line direction to the surface of the three-dimensional object as seen from the viewpoint is expressed in the color information of the normal image. The rendering processing itself to be executed is similar to a well-known rendering processing, and a processing capable of being executed by hardware such as a digital signal processor (DSP) called as the so-called rendering engine, or the like, which is mounted in a general image generating apparatus. In the image generating apparatus mounting such hardware, the present invention is more effective.

Further, the sizes of the normal image and the image to be written in the rendering buffer are not necessarily the same as each other. In the rendering processing, the three-dimensional object is arranged in a model space, and the three-dimensional object arranged in the model space is rendered by seeing from the same viewpoint (viewpoint direction) as that of the object space. Then, the three-dimensional object may be rendered by writing (i.e. by rendering) the image of the three-dimensional object arranged in the model space generated by the rendering in the rendering buffer. In this case, because it is not required to render the whole object space which can be seen from the viewpoint, it is possible to realize the higher processing at low cost (having short processing time).

Further, in order to arrange the predetermined brush image at the arrangement angle, for example, a standard direction and a rotation center point may be defined to the brush image in advance, an arrangement direction of the brush image may be determined on the basis of the standard direction, the rotation center point and the arrangement angle of the brush image.

Preferably, as the invention realizing the higher processing, in the image generating method as described above, the rendering buffer is formed so as to store RGB values for every pixel, the generating a normal image includes generating the normal image by setting a light ray color of the first light source to be a first color of RGB and a light ray color of the second light source to be a second color of the RGB other than the first color, executing the predetermined rendering processing, and operating the RGB values of each of pixels of the surface of the three-dimensional object, and the determining the arrangement angle of the predetermined brush image includes determining the arrangement angle of the predetermined brush image at each of the plurality of sampling points by operating a direction corresponding to the normal line of each of the plurality of sampling points, on the basis of a value of the light ray color of the first light source and a value of the light ray color of the second light source of the RGB values of the normal image.

According to the image generating method, the rendering buffer stores RGB values for every pixel (the RGB in the present specification means red, green and blue of the three original colors, respectively). In case that the light ray color of the first light source is, for example, the R (red) and the light ray color of the second light source is, for example, the G (green), the normal image can be expressed in color values of the R and the G. Consequently, because the direction corresponding to the normal line can be operated by reading the color values of the R and the G of the normal image, it is possible to operate the direction corresponding to the normal line easily.

Incidentally, because the light ray direction of the first light source and the light ray direction of the second light source cross at right angles with each other, it is possible to operate the direction corresponding to the normal line further simply.

Preferably, the image generating method as described above, further comprises setting a light source in an object space in which the three-dimensional object is provided, wherein the determining the arrangement angle of the predetermined brush image includes determining the arrangement angle of the predetermined brush image by synthesizing a light ray direction of the light source set with a direction of the normal line operated.

According to the image generating method, the arrangement angle of the brush image is determined with the consideration of the light ray direction of the light source in the object space in which the three-dimensional object is provided. Consequently, it is possible to generate an image having no contradiction with consideration of the light source of the object space.

In more detail, for example, the case where the brush image is arranged along the surface of the three-dimensional object will be considered. When the image generating method is not applied to the case, the image of the three-dimensional object having the surface on which a pattern of the brush image is expressed along a shape of the surface is generated. However, there is the possibility that the image has a contradiction in some states of the radiation of the light in the object space. More specifically, because the light source is very important element in the image, it is normal to express a bright part with a light color tone and a dark part with a dark color tone. However, when the brush image is arranged along the surface of the three-dimensional object independently of the light and shade state of light, a pattern unrelated to the light and shade state of the light is drawn on the surface of the three-dimensional object on the basis of the pattern of the brush image. The pattern gives a viewer a feeling that something is wrong. However, according to the image generating method, the arrangement angle of the brush image is, so to speak, corrected by the light ray direction of the light source set in the object space. Consequently, it is possible to remove the feeling that something is wrong, and to generate an image having no contradiction with regard to the light source set in the object space.

Preferably, the image generating method as described above, further comprises operating a direction from a predetermined position of the normal image generated to each of the plurality of sampling points, wherein the determining the arrangement angle of the predetermined brush image includes determining the arrangement angle of the predetermined brush image by synthesizing the direction operated with a direction determined on the basis of the color information of the normal image.

Preferably, the image generating method as described above, further comprises operating a direction from a predetermined position of the normal image generated to each of the plurality of sampling points, wherein the determining the arrangement angle of the predetermined brush image includes determining the arrangement angle of the predetermined brush image by synthesizing the light ray direction of the light source set and the direction operated with angle information determined on the basis of the color information of the normal image.

For example, when the viewpoint looks squarely at the three-dimensional object, the three-dimensional object is rendered at the center part of the image. On the other hand, when the viewpoint looks obliquely at the three-dimensional object, the three-dimensional object is not rendered at the center part of the image. That is, the center position of the image is the direction of the eyes line of the viewpoint. Incidentally, when one three-dimensional object is pictorially expressed, if a brush image can be arranged in a circular arc having a substantial center position of the three-dimensional object as the center of the circular arc, it is possible to realize the expression having a more stereoscopic effect. According to the image generating method, for example, because the predetermined position of the normal image is the center of the three-dimensional object of the normal image, it is possible to realize the expression having a more stereoscopic effect.

Further, when the predetermined position of the normal image is a position of a gaze point, it is also possible to correct the arrangement angle of the brush image so as to arrange the brush image along a circle arc having the gaze point as the center of the circle arc. In this case, because the pattern of the image (the pattern of the brush image) having the gaze point as its center is expressed, it is possible to entice the eyes line of a viewer. Incidentally, the ratio of synthesizing operated directions from the predetermined position of the normal image to the plurality of sampling points can be suitably set. For example, when the predetermined position is set at the position of the gaze point, the ratio of synthesizing the directions may be changed according to a degree of turning the eyes line of the viewer to the gaze point. For example, a something like a degree of gazing to the gaze point may be determined in advance, and the ratio of synthesizing the directions may be changed according to the degree of gazing.

Preferably, the image generating method of the first aspect of the present invention, further comprises: setting a light source in an object space in which the three-dimensional object is provided; and calculating shadow information of the three-dimensional object by executing predetermined rendering processing based on the predetermined viewpoint and the light source set, wherein the setting a plurality of sampling points includes setting the plurality of sampling points on the basis of the shadow information calculated.

According to the image generating method, the sampling points are set on the basis of the shadow information of the three-dimensional object obtained on the basis of the light source set in the object space. Consequently, when arranging a plurality of brush images, the more the brush images are arranged to be placed on one another, the denser colors of the brush images are reflected.

More preferably, the setting a plurality of sampling points includes setting the plurality of sampling points on the basis of the shadow information so that density of sampling points in a low brightness part is higher than density of sampling points in a high brightness part.

Preferably, in the image generating method as described above, the rendering the three-dimensional object includes changing brightness information on the predetermined brush image on the basis of the shadow information calculated.

According to the image generating method, brightness of the brush image is set to be high in a high brightness part of a shadow image is set to be high, and the brightness of the brush image is set to be low in a low brightness part of the shadow image. Consequently, the shadow of the three-dimensional object in the object space can be more accurately expressed. Incidentally, "the brightness of the brush image is set to be low" also includes to eliminate the color information.

Preferably, in the image generating method of the first aspect of the present invention, the performing the processing for arranging the predetermined brush image includes performing the processing for arranging the predetermined brush image by writing predetermined color information having brightness adjusted on the basis of brightness information on the predetermined brush image in the rendering buffer.

According to the image generating method, the color information to be written in the rendering buffer is color information adjusted by the brightness information on the brush image. Consequently, the color information on the brush image can be changed with holding the brightness information necessary for pictorial image expression.

Preferably, in the image generating method of the first aspect of the present invention, the performing the processing for arranging the predetermined brush image includes performing the processing for arranging the predetermined brush image by writing color information on the surface of the three-dimensional object corresponding to each of the plurality of sampling points, the color information having brightness adjusted on the basis of brightness information on the predetermined brush image in the rendering buffer.

According to the image generating method, it is possible to generate the brush image reflecting the color information of the surface of the three-dimensional object.

Preferably, in the image generating method of the first aspect of the present invention, the setting a plurality of sampling points includes changing a number of sampling points according to a distance between the predetermined viewpoint and the three-dimensional object.

According to the image generating method, for example, it is possible to increase the number of sampling points as the distance between the viewpoint and the three-dimensional object becomes shorter, and to decrease the number as the distance becomes longer. That is, it is possible to generate a pictorial image with regard to the distance between the viewpoint and the three-dimensional object and costs (a processing time or the degree of pictorial sight).

Preferably, the image generating method of the first aspect of the present invention, further comprises changing a size of the predetermined brush image according to a distance between the predetermined viewpoint and the three-dimensional object, wherein the rendering the three-dimensional object includes rendering the three-dimensional object on the basis of the predetermined brush image having the size changed.

According to the image generating method, for example, it is possible to enlarge the size of the brush image as the distance between the viewpoint and the three-dimensional object becomes shorter, and to reduce the size of the brush image as the distance becomes longer. That is, it is possible to generate a pictorial image with regard to the distance between the viewpoint and the three-dimensional object, and costs (a processing time or the degree of pictorial sight).

Preferably, the image generating method of the first aspect of the present invention, further comprises: storing information on a plurality of brush images; and selecting any one brush image of the plurality of brush images according to a predetermined condition, wherein the rendering the three-dimensional object includes rendering the three-dimensional object on the basis of the any one brush image selected.

According to the image generating method, because the three-dimensional object can be rendered by changing the brush image, it is possible to generate the image of the three-dimensional object having variously touches. The condition for selecting the brush image may be, for example, a condition corresponding to the shadow (brightness) of the three-dimensional object in the object space. That is, a first brush image is selected at a position (sampling position) having brightness which reaches a threshold value, and a second brush image is selected at a position (sampling position) having brightness which does not reach the threshold value. When the first brush image is set to be an image having lower brightness or a larger size than the second brush image, it is possible to express the shadow of the three-dimensional object in the object space more accurately.

Preferably, in the image generating method of the first aspect of the present invention, the arranging the predetermined brush image includes arranging a predetermined number of brush images so that a part of the predetermined number of brush images is placed on one another in a predetermined direction from the position at which the predetermined brush image is arranged when arranging the predetermined brush image.

According to the image generating method, for example, because a plurality of brush images can be arranged so that a part of the brush images is placed on one another at a sampling point, it is possible to realize to generate a pictorial image at higher speed. Further, the plurality of brush images may be arranged so that a part of the brush images is placed on one another in the direction corresponding to the normal line obtained on the basis of the color information of the sampling point. In this case, it is possible to realize to render the image at high speed and generate the image along the surface of the three-dimensional object which hardly causes a feeling that something is wrong.

More preferably, the arranging the predetermined brush image includes arranging a predetermined number of brush images so that a part of the predetermined number of brush images is placed on one another in a predetermined direction based on the arrangement angle of the predetermined brush image when arranging the predetermined brush image.

Preferably, in the image generating method of the first aspect of the present invention, the setting a plurality of sampling points includes shifting positions of the plurality of sampling points set as time passes, and the rendering the three-dimensional object includes rendering the three-dimensional object on the basis of the positions shifted of the plurality of sampling points.

According to the image generating method, even when the three-dimensional object and the viewpoint are not moving, it is possible to give a feeling that a pictorial three-dimensional object exists (a feeling that the surface of the three-dimensional object is buzzing) by shifting the positions of the sampling points.

Preferably, in the image generating method of the first aspect of the present invention, the rendering the three-dimensional object includes rendering the three-dimensional object by shifting the arrangement angle of the predetermined brush image arranged as time passes.

According to the image generating method, even when the three-dimensional object and the viewpoint are not moving, it is possible to give a feeling that a pictorial three-dimensional object exists (a feeling that the surface of the three-dimensional object is buzzing) by shifting the arrangement angle of the brush image.

In accordance with a third aspect of the present invention, a storage medium has information recorded thereon, when the information is loaded onto an operating apparatus, the information making the operating apparatus execute the method of the first aspect of the present invention.

In accordance with a fourth aspect of the present invention, a data signal embodied in a carrier wave, comprises information used for executing the method of the first aspect of the present invention.

In accordance with a fifth aspect of the present invention, when a program is loaded onto an operating apparatus, the program makes the operating apparatus execute the method of the first aspect of the present invention.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 19 is a view showing an example of the data structure of sampling setting information 714;

FIG. 20 shows a view showing an example of the data structure of retouch setting information 716;

FIGS. 22A and 22B are conceptual diagrams for explaining random patterns;

PREFERRED EMBODIMENTS OF THE INVENTION

[First Embodiment]

With reference to FIGS. 1–17 and FIG. 30, a first embodiment to which the present invention is applied will be described. The present embodiment will be described by the use of an exemplified case of generating a retouched image (an image to which touches are given, or an image including touch information) necessary for generating an NPR image having handwriting style touches on the basis of an image of an object arranged in an object space (a three-dimensional virtual space) as seen from a given viewpoint.

The "handwriting style touches" mentioned here mean, for example in case of oil painting, light and shade which correspond to the script generated by painting a canvas with a brush. In the retouched image, brightness information corresponding to the script is stored.

[Description of Structure]

Figure 1:
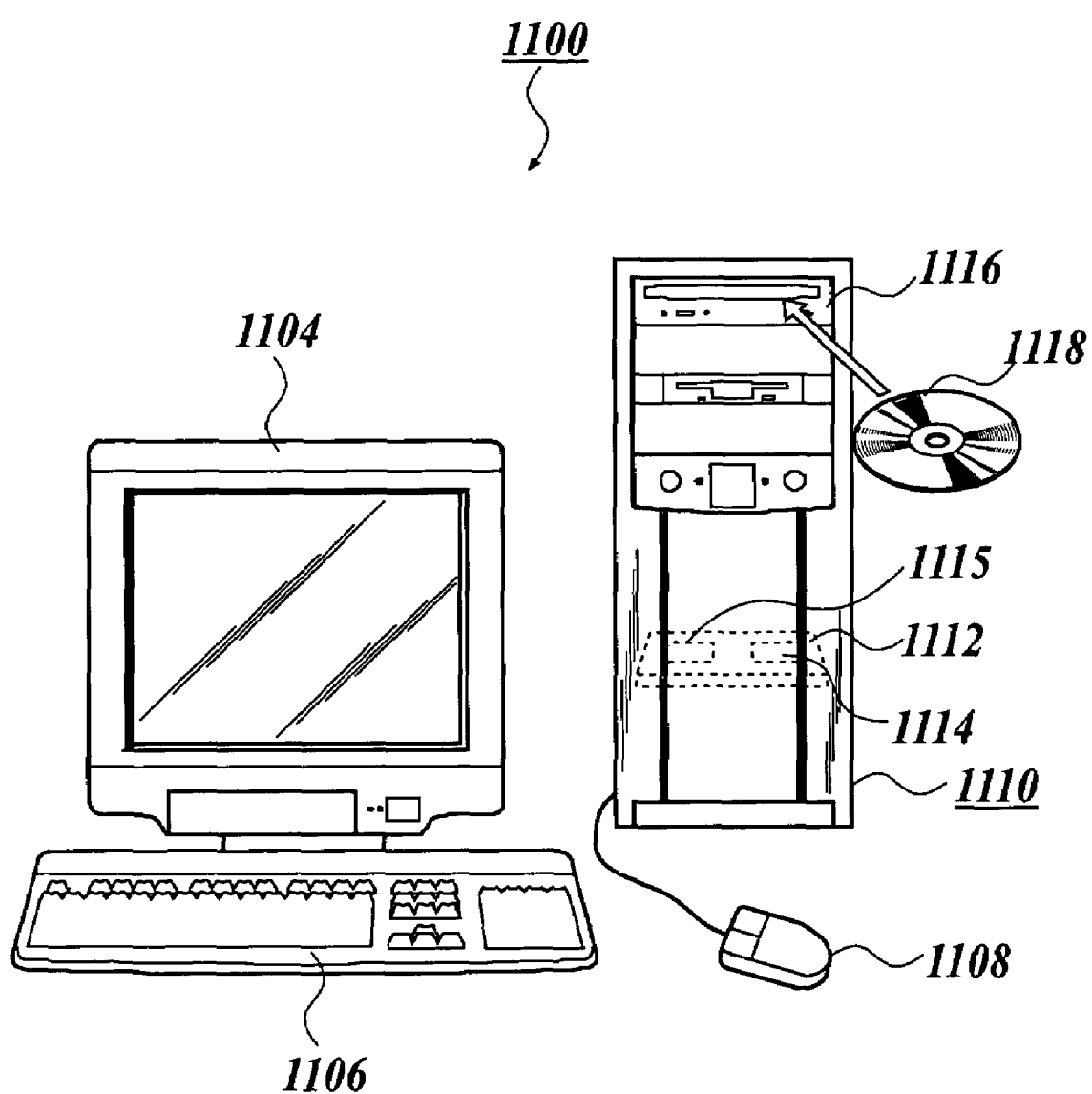
FIG. 1 is a view showing an example of a structure of an image generating apparatus 1100 of a first embodiment.

FIG. 1 is a view showing an example of the structure of an image generating apparatus 1100 of the present embodiment. As shown in FIG. 1, the image generating apparatus 1100 comprises an apparatus body 1110, a monitor 1104, a keyboard 1106 and a mouse 1108.

The apparatus body 1110 comprises an operation processing unit 1112 taking various pieces of operation processing related to image processing and integrated control of the image generating apparatus 1100, a storage device 1114 for storing programs or data, and a rendering buffer 1115 for storing information to be displayed on the monitor 1104 as an image.

The operation processing unit 1112 is implemented by the use of an operation device such as a central processing unit (CPU), a digital signal processor (DSP), an application specific integrated circuit (ASIC) or the like, and hardware such as an integrated circuit (IC) memory or the like. The operation processing unit 1112 realizes various functions by reading programs or data which are stored in the storage device 1114 suitably to use them. The storage device 1114 is implemented by the use of, for example, an IC memory, a hard disk, a magneto-optical disc (MO), a digital versatile disc (DVD) or the like. The rendering buffer 1115 is implemented by, for example, an IC memory or the like.

A user inputs operation related to image processing with the operation input section composed of the keyboard 1106 or the mouse 1108. The keyboard 1106 and the mouse 1108 may be implemented by means of other input equipment such as a tablet or the like.

The monitor 1104 is implemented by a display device such as a cathode-ray tube (CRT), a liquid crystal display (LCD), an electroluminescent device (ELD), a plasma display panel (PDP) or the like. The monitor 1104 displays processes of image processing, images of results of the image processing, or the like to make the user confirm them.

The image generating apparatus 1100 can be implemented by, for example, a personal computer, a consumer game machine, an arcade game machine, a personal digital assistant (PDA) or the like, but the image generating apparatus 1100 is not limited to these devices.

Further, the apparatus body 1110 may be configured to be provided with an information storage medium reading device 1116 to read a program or data suitably for use out of a computer readable information storage medium such as a compact disc read-only memory (CD-ROM) 1118 or the like.

[Description of Functional Block]

Figure 2:
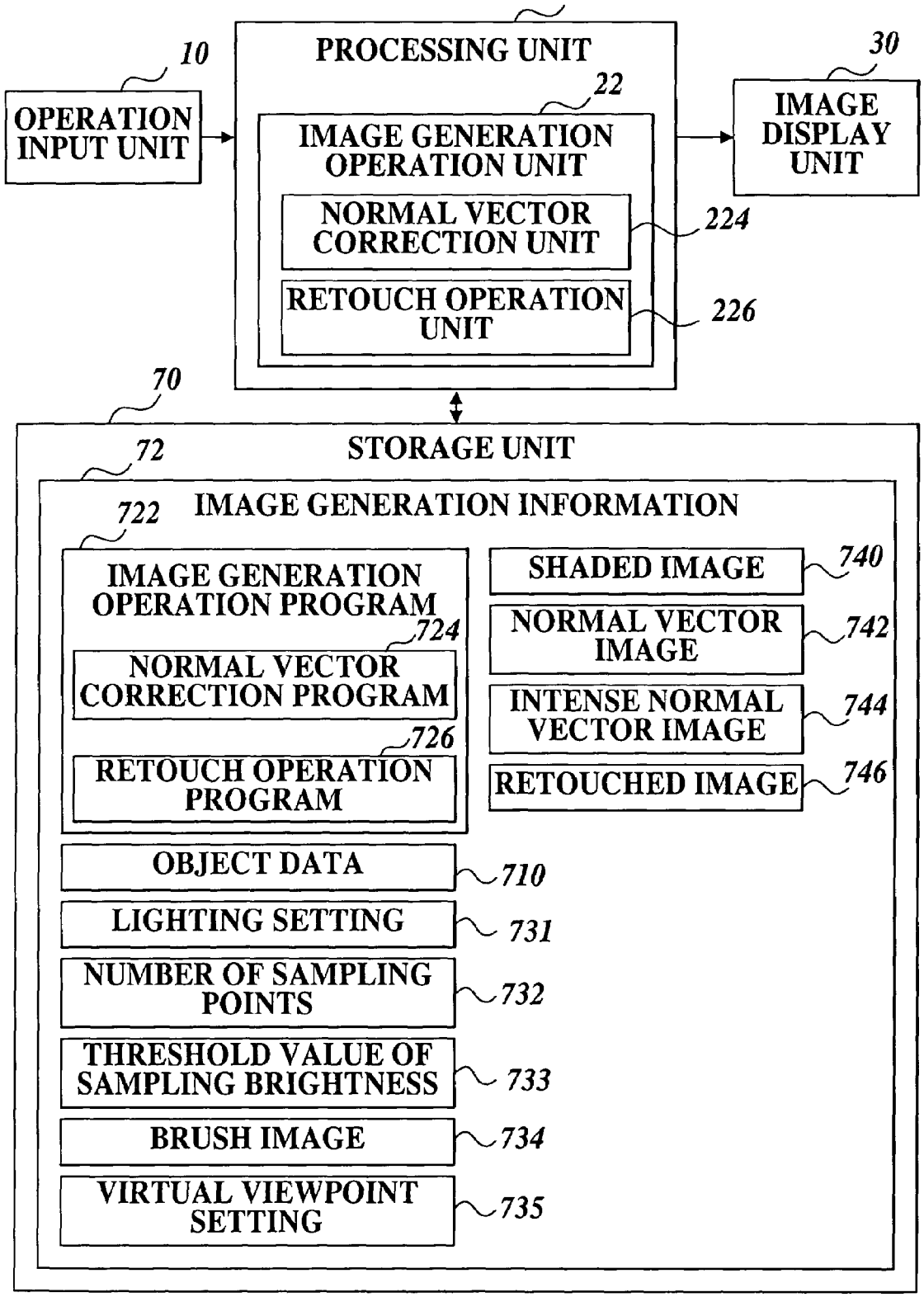
FIG. 2 is a function block diagram showing an example of a functional structure of the image generating apparatus 110 of the first embodiment.

FIG. 2 is a functional block diagram showing an example of the functional structure of the image generating apparatus 1100 of the present embodiment. As shown in FIG. 2, the image generating apparatus 1100 comprises an operation input unit 10, a processing unit 20, an image display unit 30 and a storage unit 70.

The operation input unit 10 accepts operation inputted by the user. The operation input unit 10 is implemented by, for example, a switch, a lever, a track pad, a dial, a tablet or the like. The keyboard 1106 or the mouse 1108 of FIG. 1 corresponds to the operation input unit 10.

The processing unit 20 executes various pieces of operation processing on the basis of a predetermined program, and unitedly controls functions of the image generating apparatus 1100. The processing unit 20 further executes image generation and image processing by means of an image generation operation unit 22. The functions of the processing unit 20 are implemented by, for example, hardware such as a CPU (of a complex instruction set computer (CISC) type, or of a reduced instruction set computer (RISC) type), an ASIC (a gate array or the like) or the like and related control programs or the like. The operation processing unit 1112 of FIG. 1 corresponds to the processing unit 20.

The image generation operation unit 22 executes various pieces of operation processing necessary for the image generation and the image processing, and executes write processing of color information into the rendering buffer 1115. To put it more concretely, the image generation operation unit 22 executes, for example, geometry operation for setting a three-dimensional virtual space (an object space), arranging an object or a light source into the virtual space, converting coordinates, clipping, calculating brightness or the like, rendering operation executing interpolation calculation of colors of each pixel of a two-dimensional image or hidden-surface processing thereof on the basis of vertex position coordinates and brightness values of the object obtained by the geometry operation, and the like In the present embodiment, the image generation operation unit 22 generates a shaded image 740 and a normal vector image 742.

Figure 3:
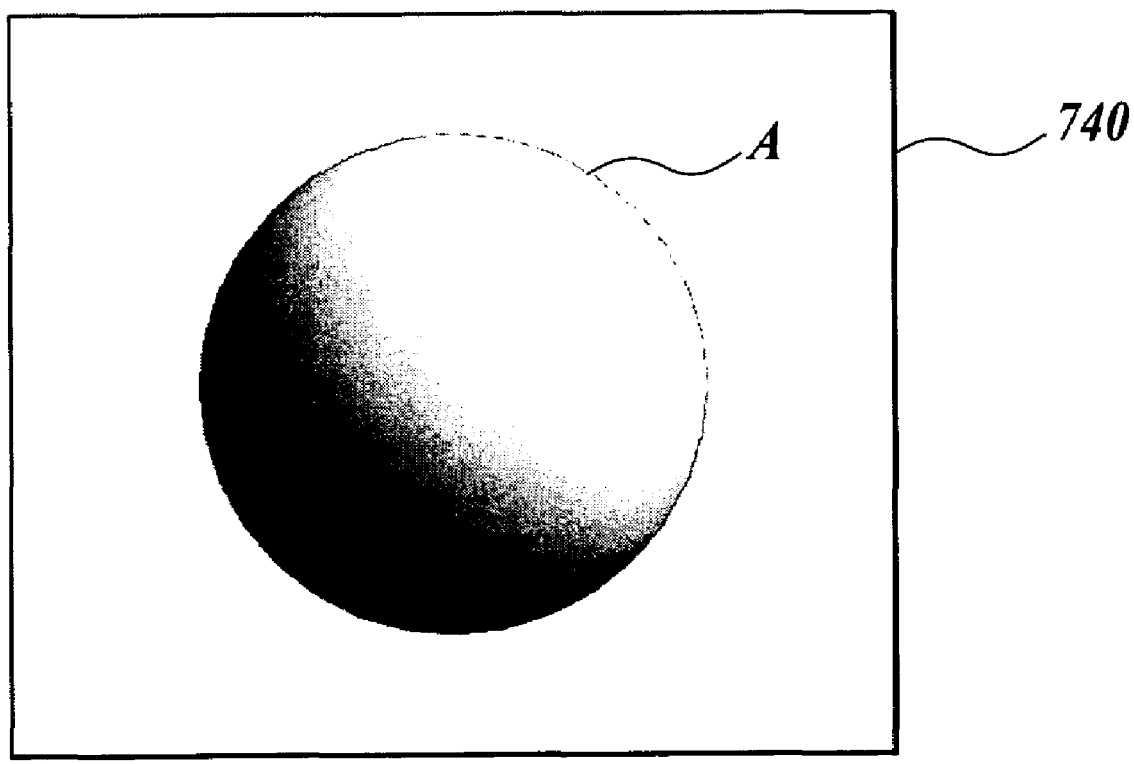
FIG. 3 is a view showing an example of a shaded image 740 of a sphere object A as an object.

FIG. 3 is a view showing an example of the shaded image 740 of a sphere object as an object. The shaded image 740 is also called as a shade image. In the present embodiment, the shaded image 740 is a gray scale image including a surface which receives light from a light source to have a high brightness (light) and a shadow part having a low brightness (dark). The generation of the shaded image 740 requires less processing than that in case of the generation of a color image.

The normal vector image 742 is a color image having normal information of polygon surfaces constituting the object A as RGB values (brightness values of the three primary colors of red, green and blue) being color information of pixels. The normal vector image 742 is sometimes called as a normal map or a normal image.

Figure 4:
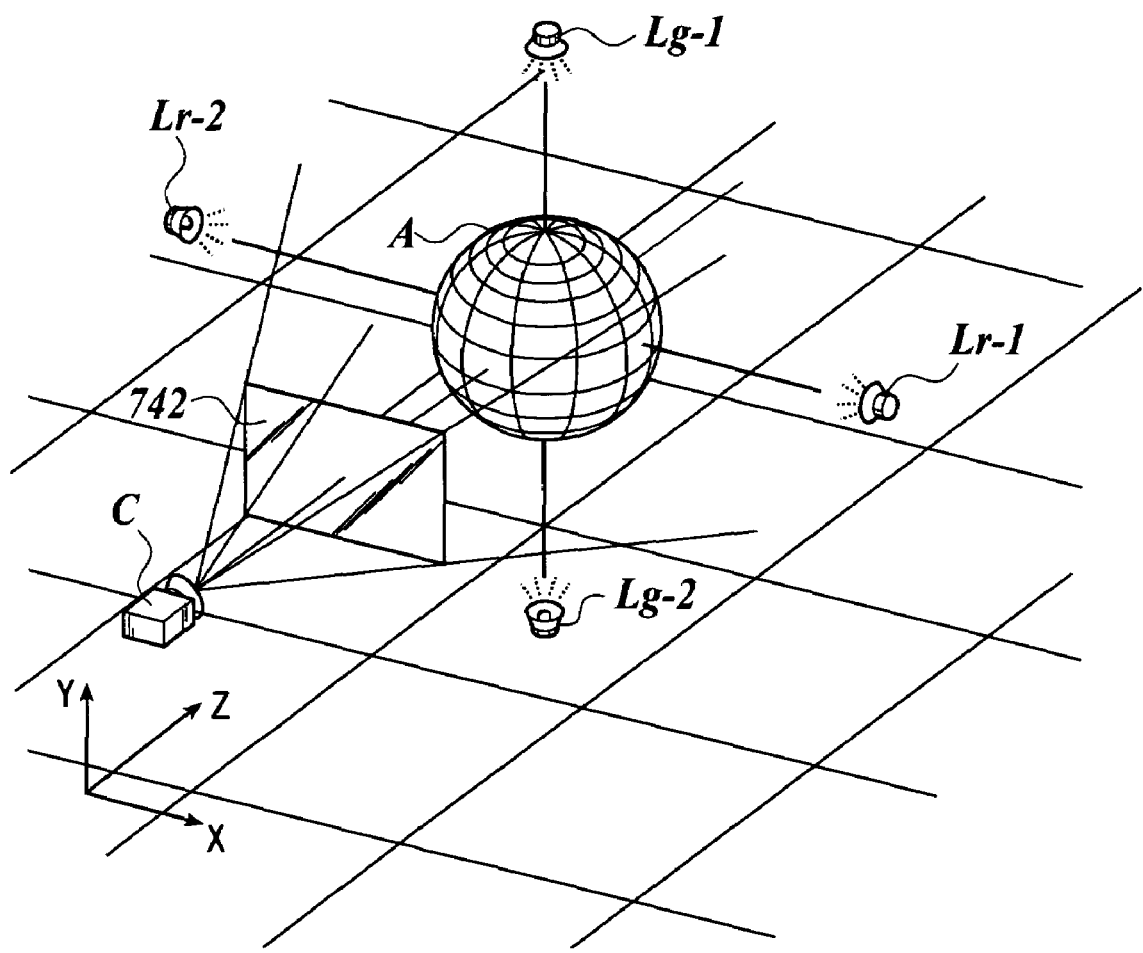
FIG. 4 is a view for explaining the concept of a method for generating a normal vector image 742 of the first embodiment.

FIG. 4 is a view for explaining the concept of a method for generating the normal vector image 742 in the present embodiment. The material attribute of the object A is set to have, for example, 1.0 (100%) of ambient components of all of the colors of RGB and also 1.0 (100%) of diffuse components of all of the colors of RGB. Then, as shown in FIG. 4, a red color parallel ray light source Lr-1 having the brightness of +50% is set in the plus direction of the X-axis, and a red color parallel ray light source Lr-2 having the brightness of −50% is set in the minus direction of the X-axis, on the basis of the local coordinates of a virtual viewpoint. Similarly, a green color parallel ray light source Lg-1 having the brightness of +50% is set in the plus direction of the Y-axis, and a green color parallel ray light source Lg-2 having the brightness of −50% is set in the minus direction of the Y-axis.

When rendering is performed in this state, the light which has been irradiated to the object A in the X direction and the Y direction is reflected in the specular direction (right in the front) at the strongest intensity to each parallel ray light source, and the light becomes weaker as it shifts from the specular direction. That is, the brightness value is "127" (50% of "255") in the specular direction, and is "0" in the direction of a right angle to the parallel rays. Further, the brightness values include "− (minus)" in the positions toward the minus direction of each axis. Consequently, the brightness values have the values within the range of "−127 to 128 (width: 256)".

The image generation operation unit 22 adds "127" to the brightness values to correct the brightness values to be ones within the range of "0 to 255", and sets the corrected brightness values as the R values and the G values of the color information of the pixels of the normal vector image 742. Further, it is supposed that "255" is stored in the α value of each of pixels in which the object is rendered and, that "0" is stored in the α value of each of pixels in which the object is not rendered, as mask information for distinguishing whether the object is rendered or not.

Normal vectors VN as the normal vectors at the time when the surfaces (the polygon surfaces) constituting the object are projected on the XY-plane of the screen coordinates can be calculated by referring to the R values and the G values of the color information of the pixels of the normal vector image 742 to make the brightness value "255" correspond to the vector value "1", to make the brightness value "127" correspond to the vector value "0" and to make the brightness value "0" correspond to the vector value "−1". For example, the R and G values of a surface perpendicular to the XY-plane facing the plus direction of the X-axis are (255, 127), and the vector values thereof are (1, 0)

Figure 5:
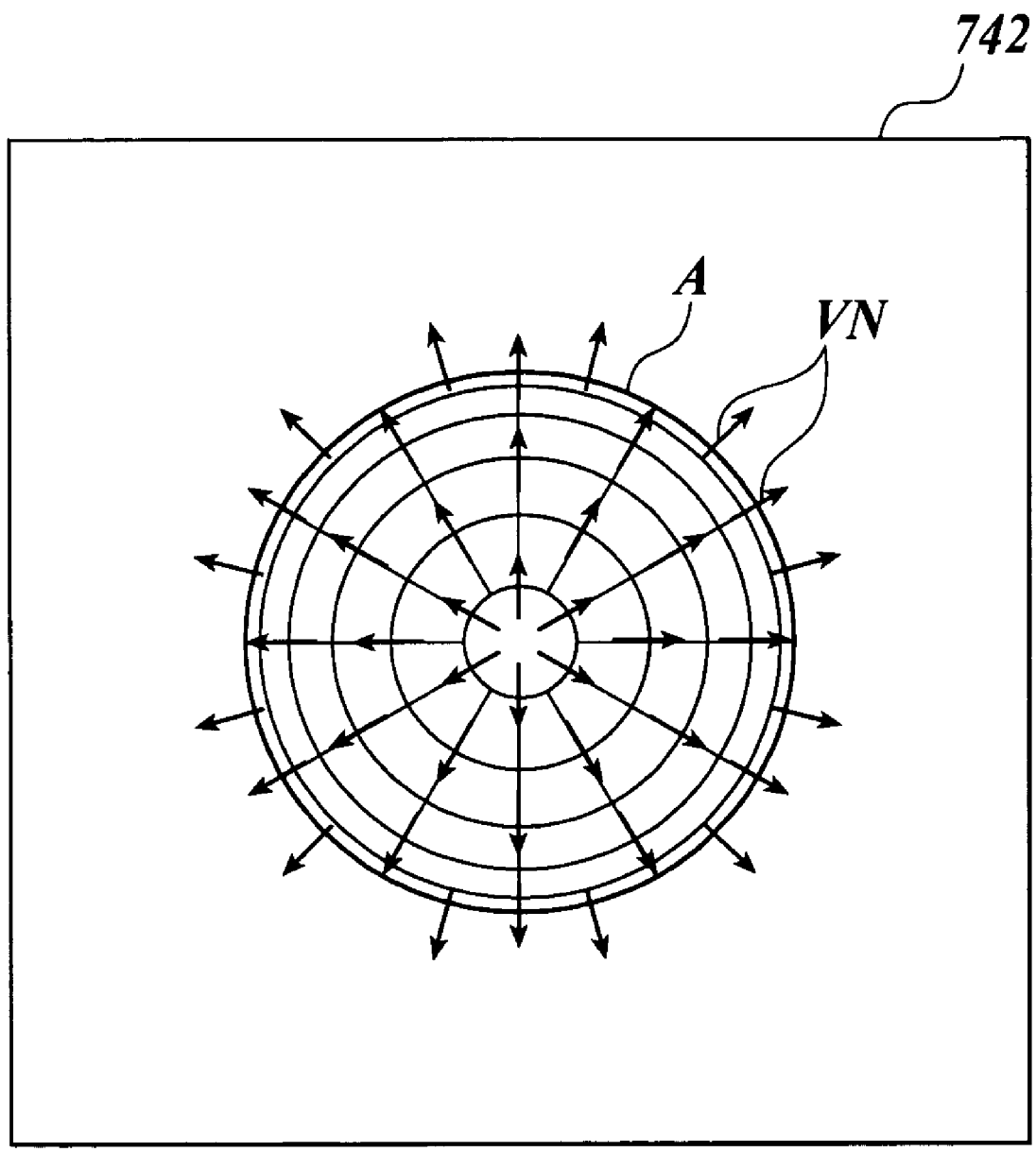
FIG. 5 is a view showing the normal vector image 742 schematically when the object thereof is the sphere object A.

FIG. 5 is a view showing the normal vector image 742 schematically when the object is the sphere object. In FIG. 5, the normal vectors VN are exhibited as arrows for the sake of convenience. As shown in FIG. 5, the normal vectors VN are in a radial state from the apex of the sphere (the center of the circle in FIG. 5) as the center in the case where the sphere object is used as the object.

As described above, in the present embodiment, when the normal vector image 742 is generated, the B value of color information is not used as an operation object, and the normal vectors VN are treated as two-dimensional vectors composed of X components and Y components. The reason is that the retouch operation unit 226 as follows performs operation based on the orientation vectors off the surface of the object projected on the XY-surface of the screen coordinates in, which will be described later. Consequently, in order to generate the normal vector image 742, the image generation operation unit 22 can generate the normal vector image 742 only by setting the parallel ray light sources in the X-axis direction and the Y-axis direction severally, and by performing the rendering to values other than the B values of color information. As a result, the image generation operation unit 22 can process the normal vector image 742 at higher speed than that in case of treating the normal vectors VN as three-dimensional vectors.

In FIG. 2, in the present embodiment, the image generation operation unit 22 further comprises a normal vector correction unit 224 and the retouch operation unit 226.

The normal vector correction unit 224 corrects the normal vectors VN stored as the R value and the G value of the color information of each pixel of the normal vector image 742 according to (1) the light ray directions of the light sources set in the virtual space and (2) the positional relationship between the image center Ob and each pixel.

Figure 6:
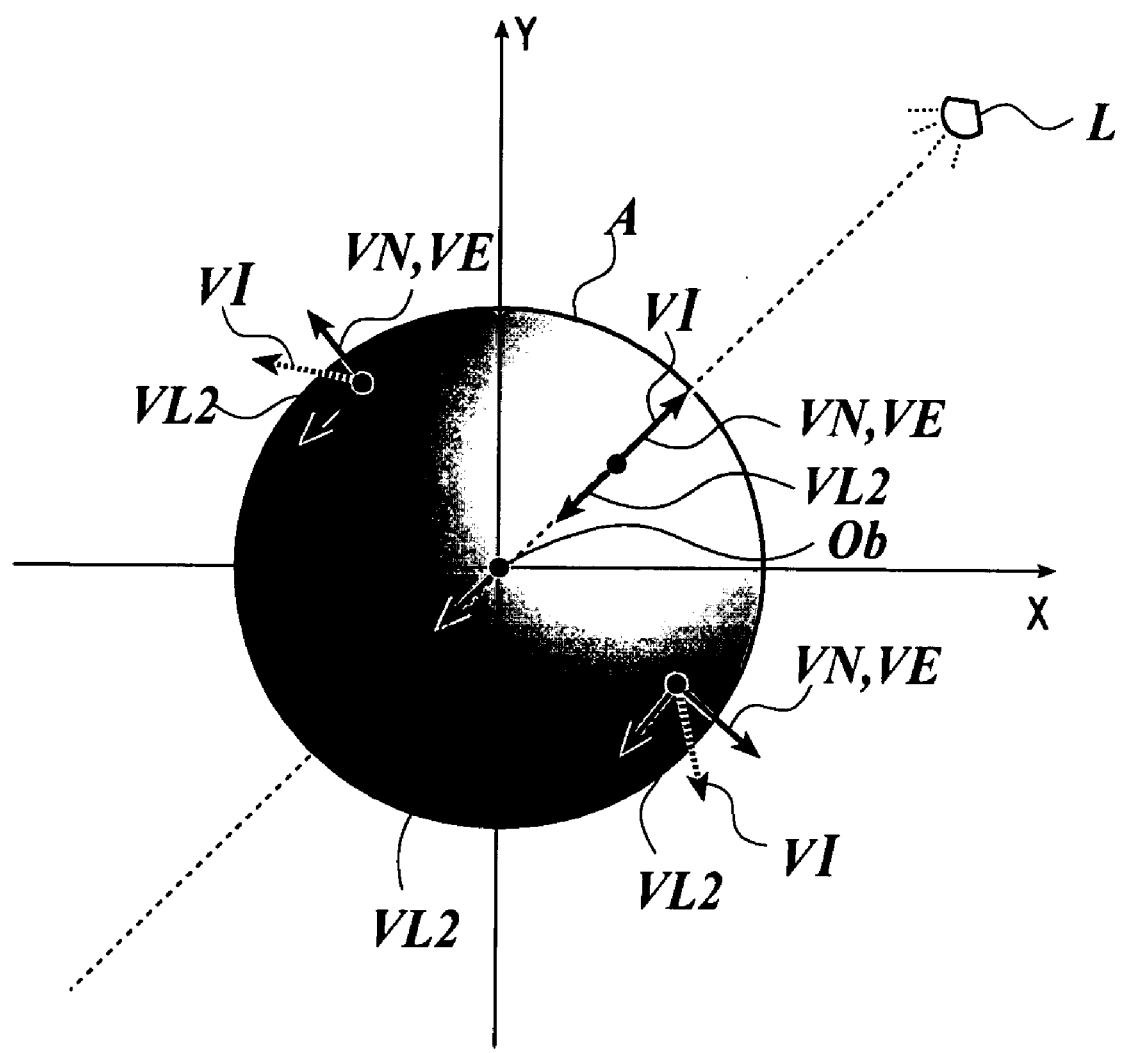
FIG. 6 is a view for explaining the concept of corrections of normal vectors.

FIG. 6 is a view for explaining the concept of the correction of normal vectors in the present embodiment. The X-axis and the Y-axis in FIG. 6 are view point coordinate axes.

The image generation operation unit 22 obtains the normal vectors VN on the basis of the R values and the G values of the color information of the pixels of the normal vector image 742, regarding all of the pixels for rendering the object A. Further, for example, the image generation operation unit 22 obtains the light ray vectors VL2 indicating the directions of light on the XY-plane on the basis of the XY components in the position coordinate set for the light source L. Further, for example, the image generation operation unit 22 obtains the eyes vector VE, for example, by subtracting the XY components of a pixel to be processed from the XY components of the image center Ob of the normal vector image 742.

Then, the image generation operation unit 22 converts each of the normal vectors VN, the light ray vectors VL2 and the ray vectors VE to a unit vector severally, and synthesizes the converted unit vectors. Furthermore, the image generation operation unit 22 converts the synthesize vector to a unit vector. The finally obtained XY two-dimensional vector is called as an intense normal vector VI.

An image having the X values and the Y values of the two-dimensional vector components of the intense normal vectors VI as the R values and the G values of pixels, respectively, is called as an intense normal vector image 744.

In the generation of the intense normal vector image 744, because of the similar reason to that at the generation of the above-mentioned normal vector image 742, the B values of the color information of the pixels are not set to be the operation object. Consequently, the image generation operation unit 22 can perform the synthesis of vectors, their conversion to unit vectors or the like easily.

Figure 7:
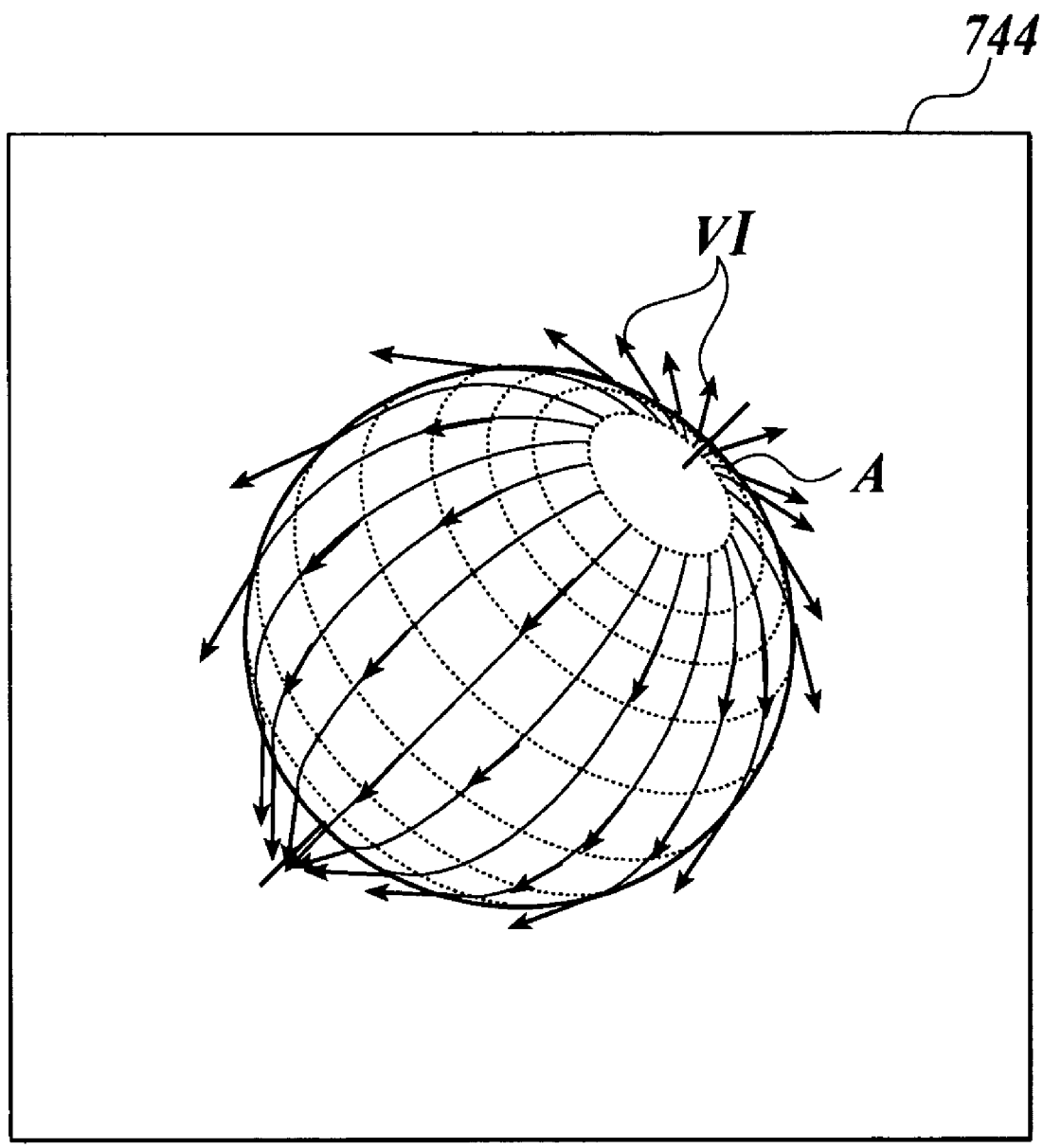
FIG. 7 is a view showing an intense normal vector image 744 having the sphere object A as an object schematically.

FIG. 7 is a view showing the intense normal vector image 744 having the sphere object A as an object schematically. For the sake of convenience, the intense normal vectors VI are exhibited as arrows, and iso-brightness curves of a shadow produced by the light from the light source are exhibited as broken lines. As shown in FIG. 7, differently from the normal vectors VN (FIG. 5) which are in the radial state having the center of the apex of the sphere, the directions of the intense normal vectors VI are turned from the original normal directions (normal vectors VN) of the surface of the object in the directions of the shadows, and consequently the intense normal vectors VI have natural directions from the highlighted part toward the shadow part along the surface of the sphere.

The retouch operation unit 226 refers to the intense normal vector image 744 obtained by the normal vector correction unit 224, and generates a retouched image 746 on the basis of the intense normal vectors VI.

FIGS. 8A, 8B, 8C, 8D, 8E and 8F are views for illustrating the concept of the generation of the retouched image in the present embodiment. In the present embodiment, the brush images 734 are rendered by making the directions of the brush images 734 coincide with the directions of the intense normal vectors VI.

Figure 8A:
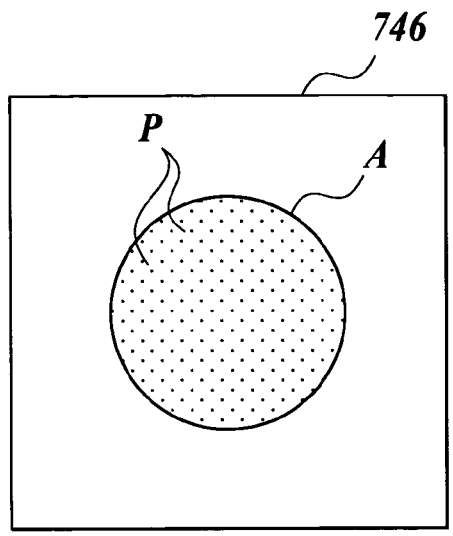
FIGS. 8A, 8B, 8C, 8D, 8E and 8F are views for explaining the concept of retouched image generation processing in the first embodiment.
Figure 8B:
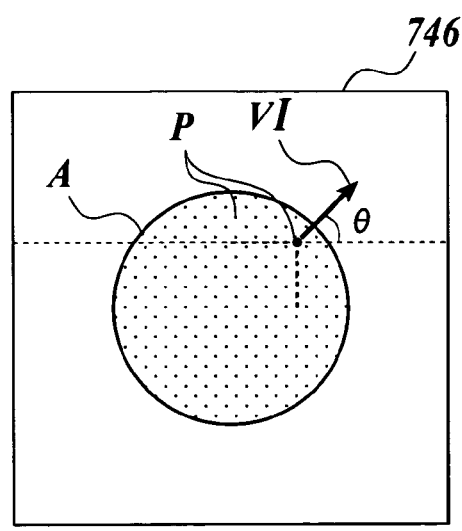

To put it more concretely, as shown in FIG. 8A, the retouch operation unit 226 sets the coordinates of a predetermined number of sampling points P on the screen coordinate. As the setting method of the sampling points P, the sampling points P may be randomly set, or may be set along a predetermined grid. Then, as shown in FIG. 8B, by referring to the R value and the G value of the color information of the position of each sampling point P, the retouch operation unit 226 obtains the intense normal vector VI on the basis of the intense normal vector image 744, and obtains the intersection angle θ with the X-axis.

Figure 8C:
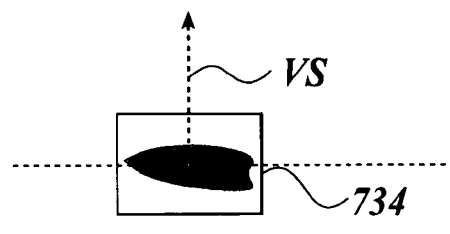
Figure 8D:
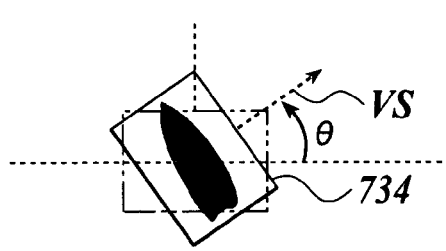
Figure 8E:
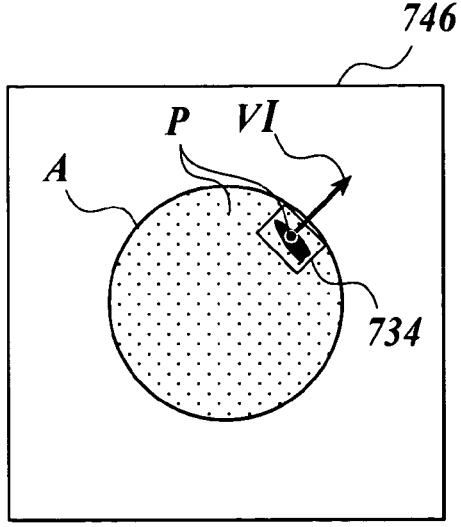
Figure 8F:
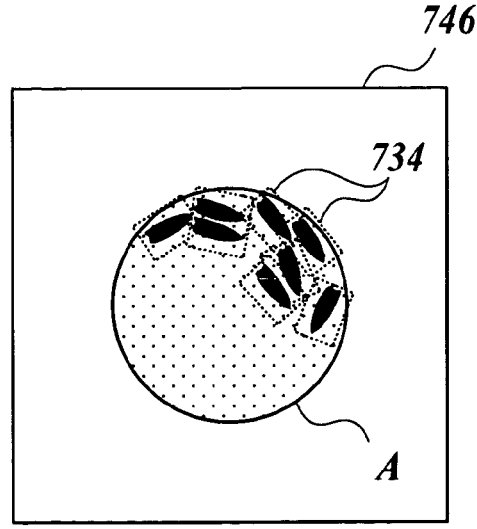

As shown in FIG. 8C, the brush image 734 is a gray scale image exhibiting a shape colored with the tip of a brush and light and shade of the coloring by means of brightness. Each brush image 734 severally includes a brush direction VS as a standard. Then, as shown in FIG. 8D, the retouch operation unit 226 clockwise rotates the brush image 734 by the intersection angle (90°~θ) so as to make the brush direction VS (a two-dimensional vector composed of an X-direction component and a Y-direction component) coincide with the direction of the intense normal vector VI. Then, the retouch operation unit 226 renders the rotated brush image 734 at the sampling point P of the retouched image 746 (FIG. 8E).

The rendering colors at rendering are determined according to the gray scale values at the positions of the sampling points P of the shaded image 740. By rendering the brush images 734 to many sampling points P, it is possible to obtain an image the touch of which was formed as if a brush is added many times.

Figure 9:
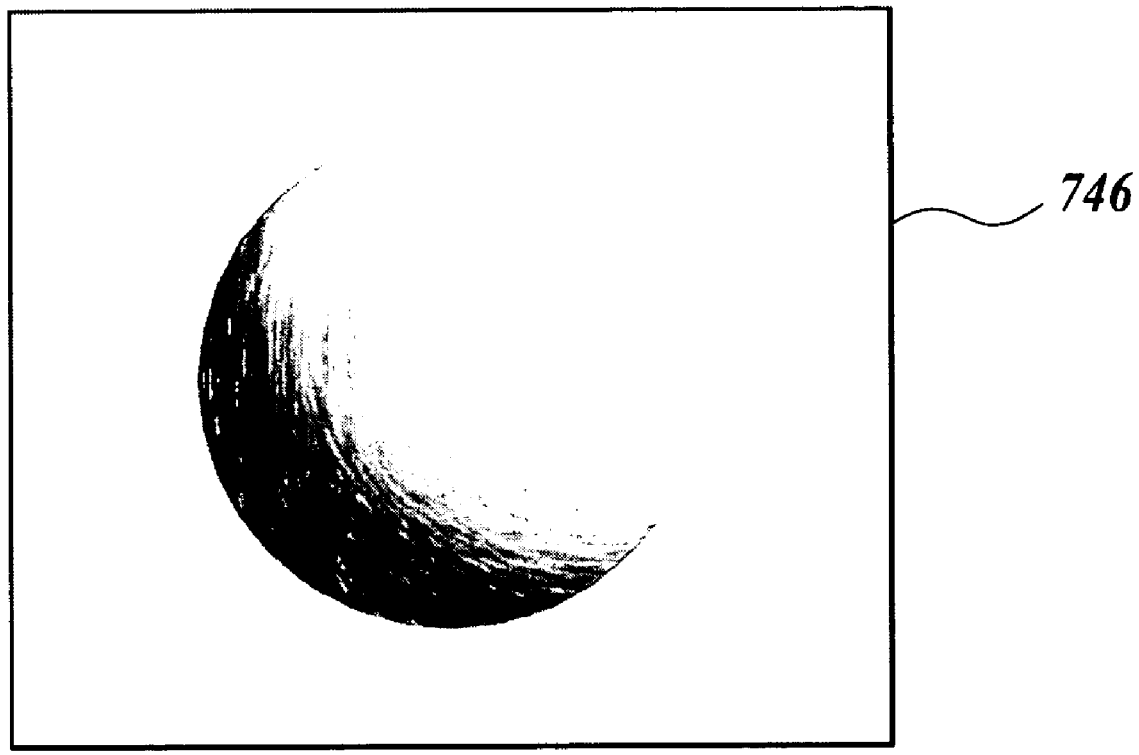
FIG. 9 is a view showing an example of a retouched image 746 based on an intense normal vector.

FIG. 9 is a view showing an example of the retouched image 746. As shown in FIG. 9, the retouched image 746 in the present embodiment is generated as a gray scale image which is formed by rendering many brush images 734 as described above. Because the intense normal vectors VI are corrected on the basis of the relationship between the direction of the light ray and the eyes line, it is possible to add the touches resembling a handwriting sensation as if a brush is added along the shadow of the object.

Figure 10:
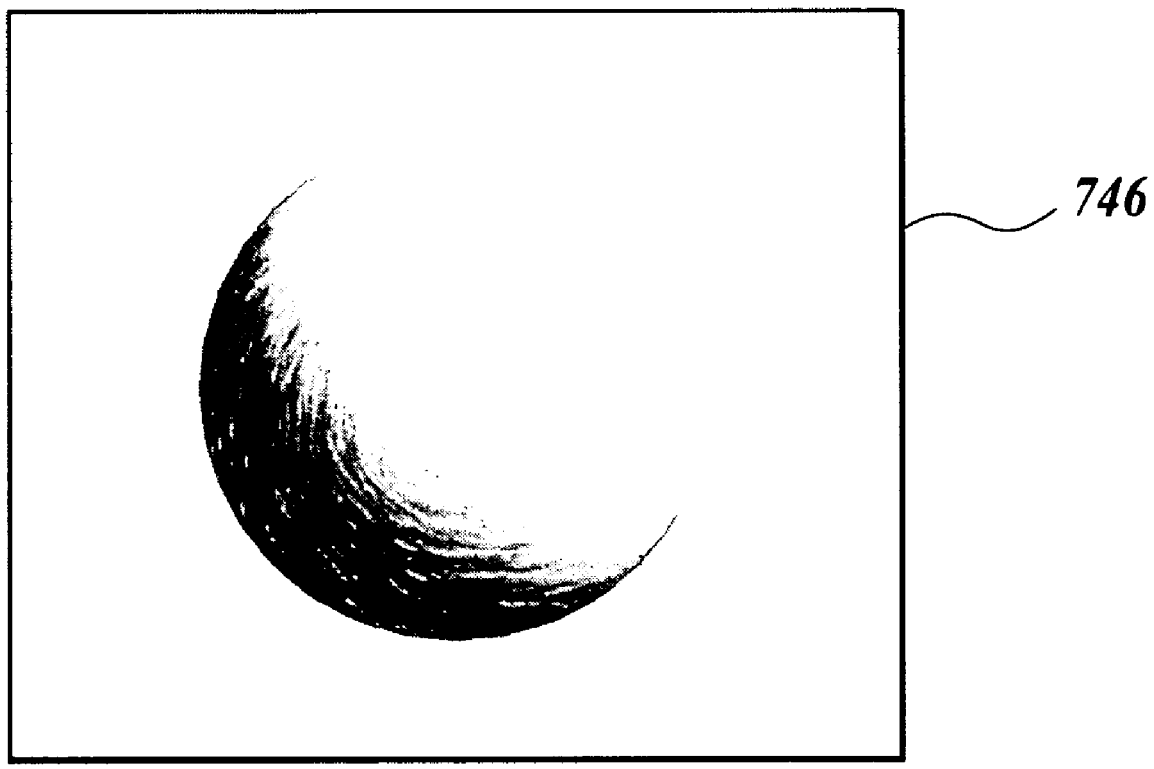
FIG. 10 is a view showing an example of the retouched image 746 based on a normal vector.

On the other hand, FIG. 10 is a view showing an example of the retouched image 746 based on the normal vectors VN. As shown in FIG. 10, there is the case of giving the impression of a feeling that something is wrong owing to the rendering of the brush images 734 in the directions different from the shadow of the object. As described above, by rendering the brush images 734 on the basis of the intense normal vectors VI, the directions of touches can be naturally arranged.

The image display unit 30 is a section capable of displaying an image generated by the processing unit 20. The image display unit 30 is implemented by, for example, an image display device such as a CRT, an LCD, a PDP, an ELD or the like, and a driver. In FIG. 1, the monitor 1104 corresponds to the image display unit 30.

The storage unit 70 is a section for storing programs or various pieces of data which are necessary for the execution of operation processing performed by the processing unit 20. The storage unit 70 is implemented by, for example, various IC memories, a hard disk, an MO, a DVD, a CD-ROM or the like. In FIG. 1, the storage device 1114 and the rendering buffer 1115 correspond to the storage unit 70.

The storage unit 70 stores an image generation operation program 722 for making the processing unit 20 function as the image generation operation unit 22. The image generation operation program 722 includes a normal vector correction program 724 for making the processing unit 20 function as the normal vector correction unit 224, and a retouch operation program 726 for making the processing unit 20 function as the retouch operation unit 226.

Further, the storage unit 70 stores object data 710, lighting setting 731, the number of sampling points 732, a threshold value of sampling brightness 733, the brush image 734 and virtual viewpoint setting 735, as data storing set values or the like.

Further, the storage unit 70 stores the shaded image 740, the normal vector image 742, the intense normal vector image 744, which is generated by the correction of the normal vector image 742, and the retouched image 746 produced by the retouch operation unit 226, as image data.

The object data 710 stores modeling data, color information (color setting of an object surface) or the like of an object being the object of image generation.

The lighting setting 731 stores set information of the light source to be arranged in the virtual space.

The number of sampling points 732 is the number of the sampling points P to which the retouch operation unit 226 performs touches.

The virtual viewpoint setting 735 stores set information of a virtual viewpoint C in the virtual space such as the position, the rotation angle, the angle of view or the like of the virtual viewpoint C.

The threshold value of sampling brightness 733 is the threshold value of brightness for judging whether the retouch operation unit 226 performs touches or not, and is compared with the brightness values at the positions of the sampling points P in the shaded image 740. In the present embodiment, the threshold value of sampling brightness 733 stores gray scale values.

Figure 11:
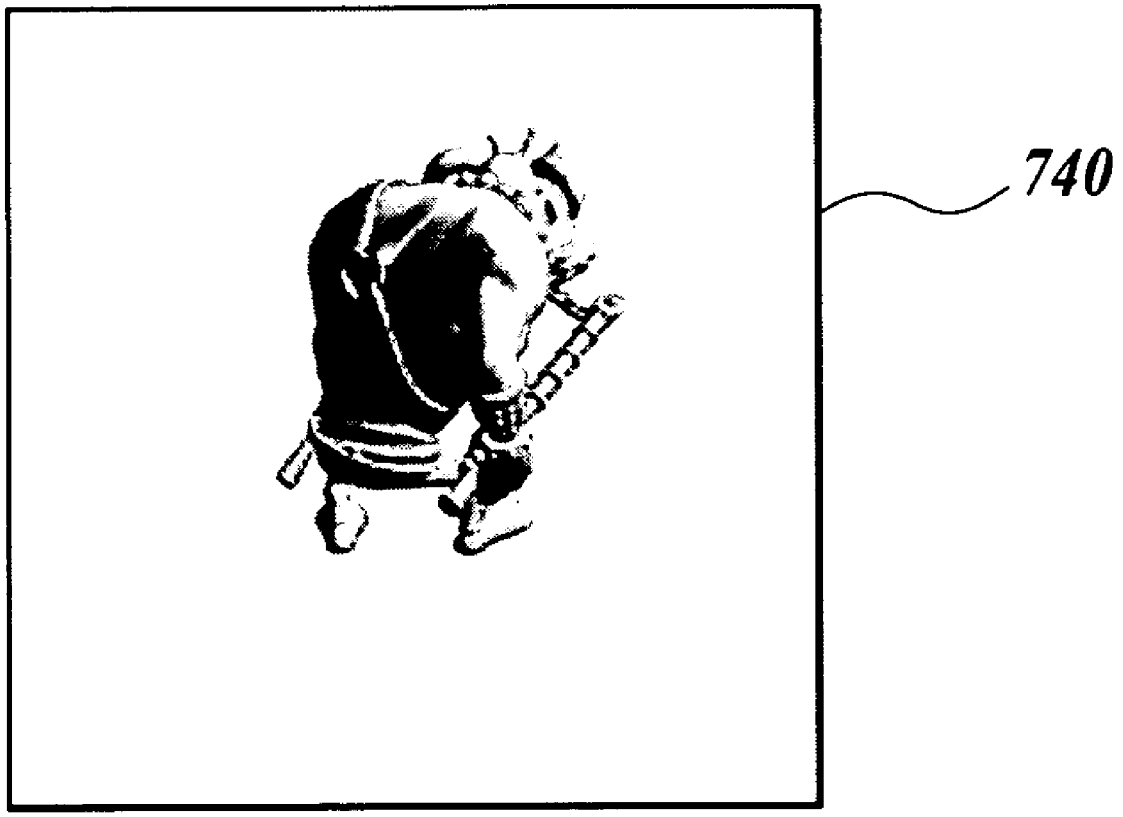
FIG. 11 shows an example of the shaded image 740 rendering appearance of a monster's back.
Figure 12:
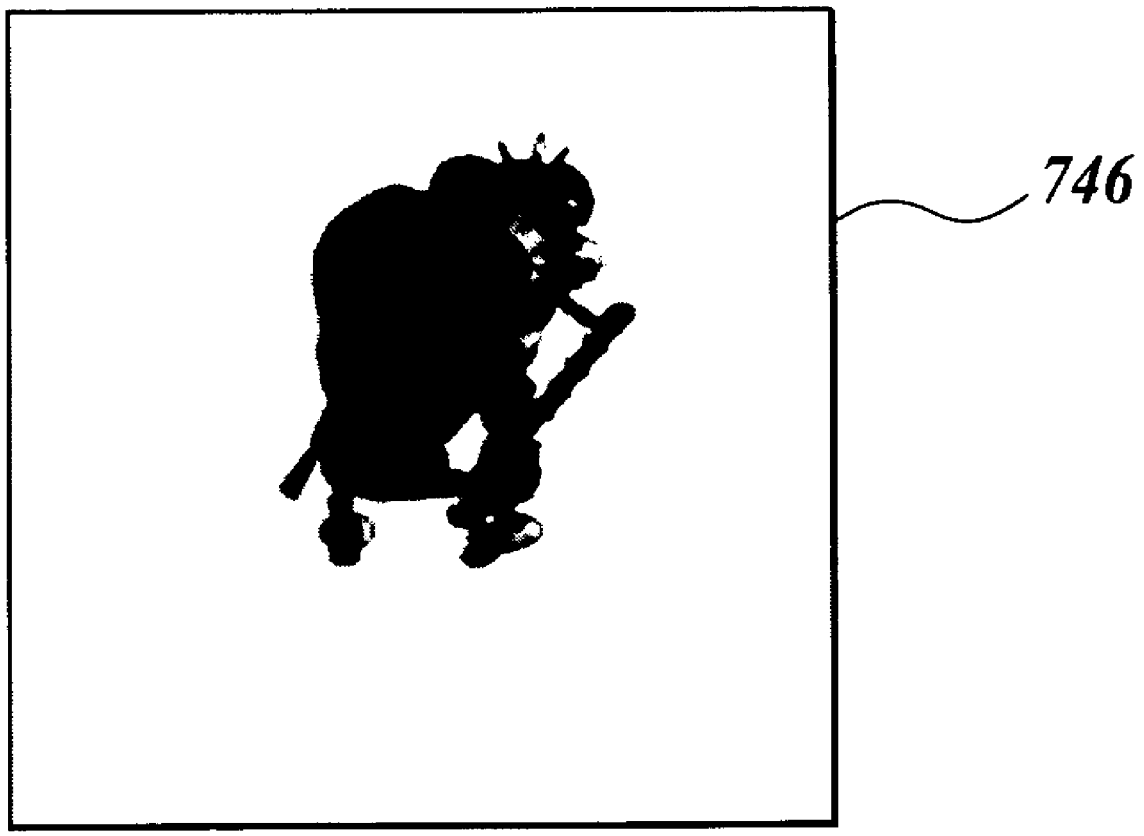
FIG. 12 shows an example of the retouched image 746 corresponding to one in FIG. 11.
Figure 13:
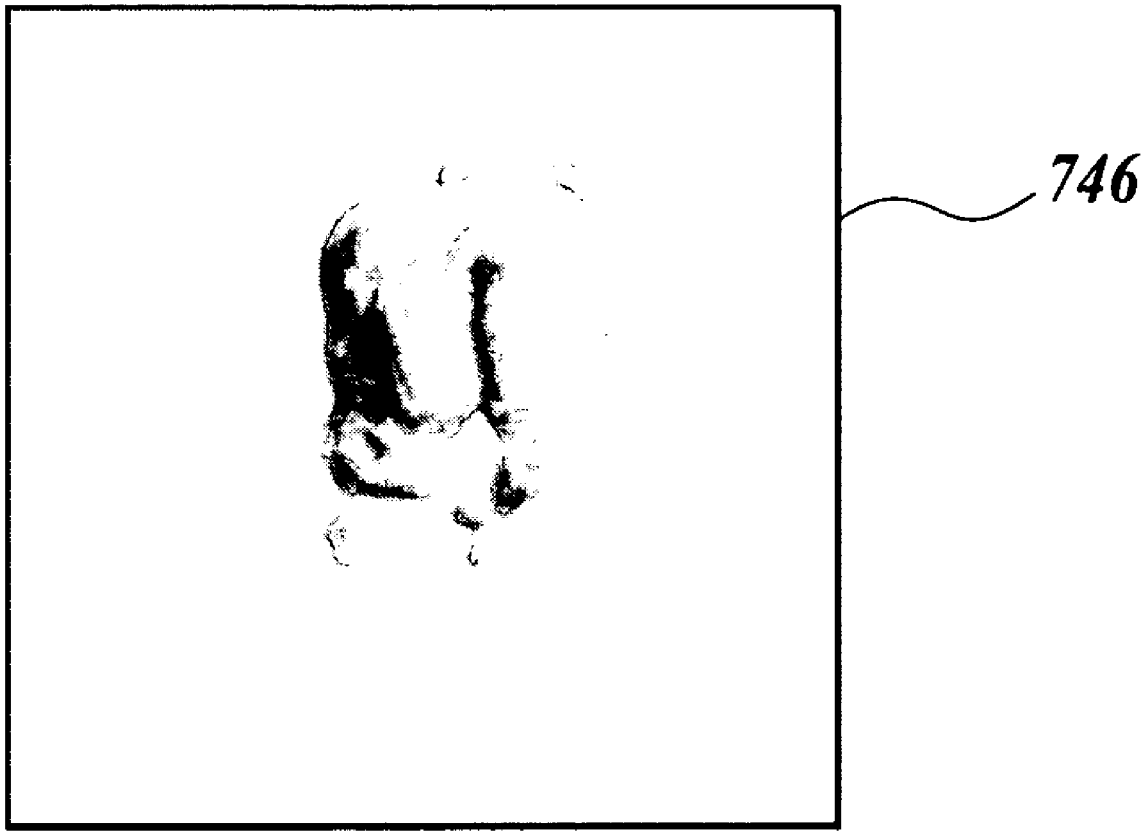
FIG. 13 shows another example of the retouched image 746 corresponding to one in FIG. 11.
Figure 14A:
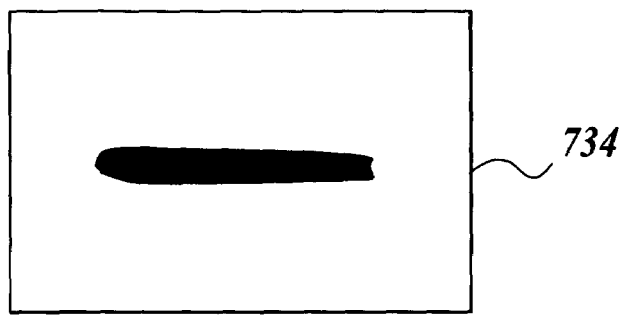
FIGS. 14A, 14B, 14C and 14D are views showing examples of brush images 734.
Figure 14B:
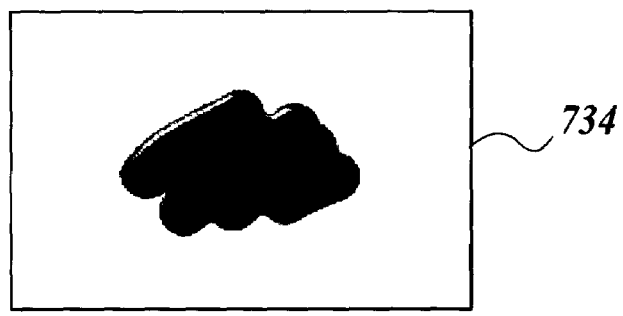
Figure 14C:
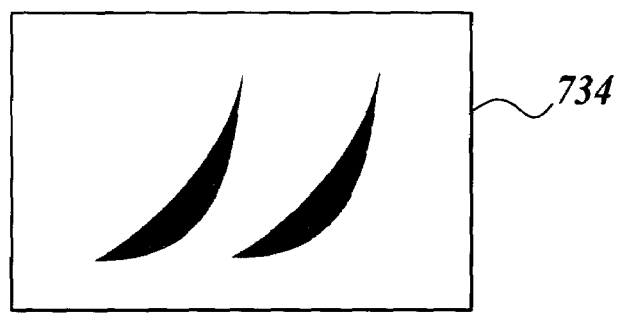
Figure 14D:
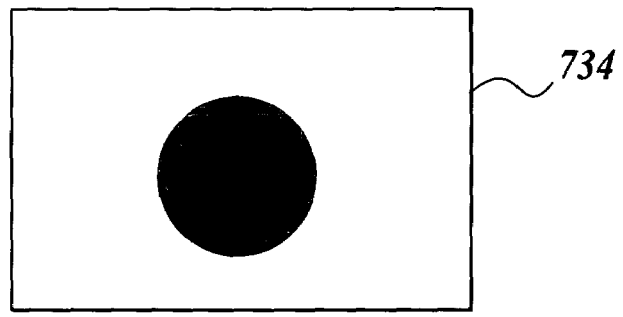

FIG. 11 shows an example of the shaded image 740 rendering the appearance of the monster's back. FIGS. 12 and 13 show examples of the retouched images 746 which correspond to one in FIG. 11 and have been generated on the basis of the different threshold values of sampling brightness 733. Incidentally, the light sources in FIGS. 12 and 13 are supposed to be set on the upper right sides in FIGS. 12 and 13. Further, the shaded images 740 in FIGS. 12 and 13 include added edges which make the shaded images 740 clear for the sake of convenience.

In the case where the threshold value of sampling brightness 733 is large (in the case where the threshold value is a brightness value near to a white color "255"), the sampling points P are set to relatively bright parts of the shaded image 740 in FIG. 11. Consequently, as shown in FIG. 12, many touches can be performed, and it becomes possible to give a serious impression. On the other hand, in the case where the threshold value of sampling brightness 733 is small (in the case where the threshold value is a brightness value near to a black color "0"), the sampling point P are set at relatively dark positions of the shaded image 740 in FIG. 11. Consequently, as shown in FIG. 13, a little touches are performed, and it becomes possible to express a lilting impression. As described above, by the appropriate setting of the threshold value of sampling brightness 733, the tone of the handwriting style touches can be controlled.

The brush image 734 is a gray scale image corresponding to a colored brightness pattern which is formed by placing a painting material such as a paintbrush, a pen or the like on a sheet of paper. FIGS. 14A, 14B, 14C and 14D are views showing examples of the brush images 734. As shown in FIGS. 14A to 14D, images capable of realizing desired touches are previously prepared as the brush images 734. Further, the sizes of the images are also appropriately set according to the desired touches such as 64×64 pixels, 128×128 pixels or the like.

[Description of Processing]

Next, the flow of processing in the present embodiment will be explained with reference to FIGS. 15–17.

Figure 15:
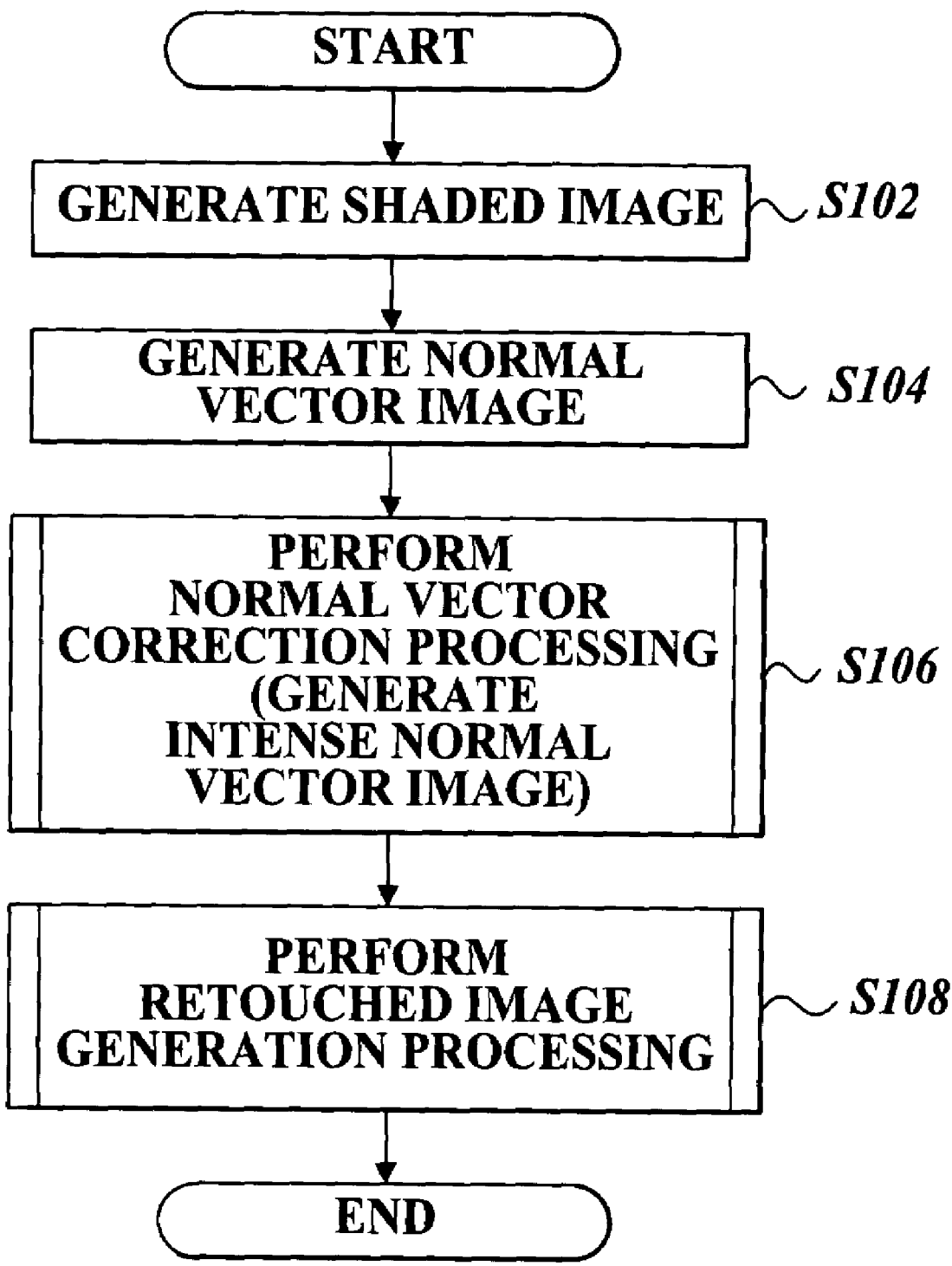
FIG. 15 is a flowchart for explaining the principal flow of processing in the first embodiment.

FIG. 15 is a flowchart for illustrating the principal flow of the processing in the present embodiment. As shown in FIG. 15, the image generation operation unit 22 first generates the shaded image 740 (Step S102). To put it more concretely, the image generation operation unit 22 sets the object space, and arranges the object with reference to the object data 710. Further, the image generation operation unit 22 arranges the light source L with reference to the lighting setting 731, and arranges the virtual viewpoint C with reference to the virtual viewpoint setting 735. Then, the image generation operation unit 22 performs shading and rendering in the gray scale, generates the shaded image 740, and stores the shaded image 740 in the storage unit 70.

Next, the image generation operation unit 22 generates the normal vector image 742 (Step S104). To put it more concretely, as shown in FIG. 4, the image generation operation unit 22 sets the material attribute of the object A so that all of the ambient components of R, G and B are 1.0 (100%) and all of the diffuse components of R, G and B are also 1.0 (100%). Then, the image generation operation unit 22 sets the red color parallel ray light source Lr-1 having the brightness of +50% of the full brightness thereof in the plus direction of the X-axis, and the red color parallel ray light source Lr-2 having the brightness of −50% of the full brightness thereof in the minus direction of the X-axis on the standard of the local coordinates of the virtual viewpoint C. Similarly, the image generation operation unit 22 sets the green color parallel ray light source Lg-1 having the brightness of +50% of the full brightness thereof in the plus direction of the Y-axis, and the green color parallel ray light source Lg-2 having the brightness of −50% of the full brightness thereof in the minus direction of the Y-axis. Then, the image generation operation unit 22 adds "127" to the R values and the G values which can be obtained by rendering in this state to set as the R values and the G values of the color information at the pixels of the normal vector image 742. Further, at this time, the image generation operation unit 22 stores "0" or "255" in the α value as the mask information for distinguishing whether the object A has been rendered or not.

Next, the normal vector correction unit 224 performs normal vector correction processing (Step S106).

Figure 16:
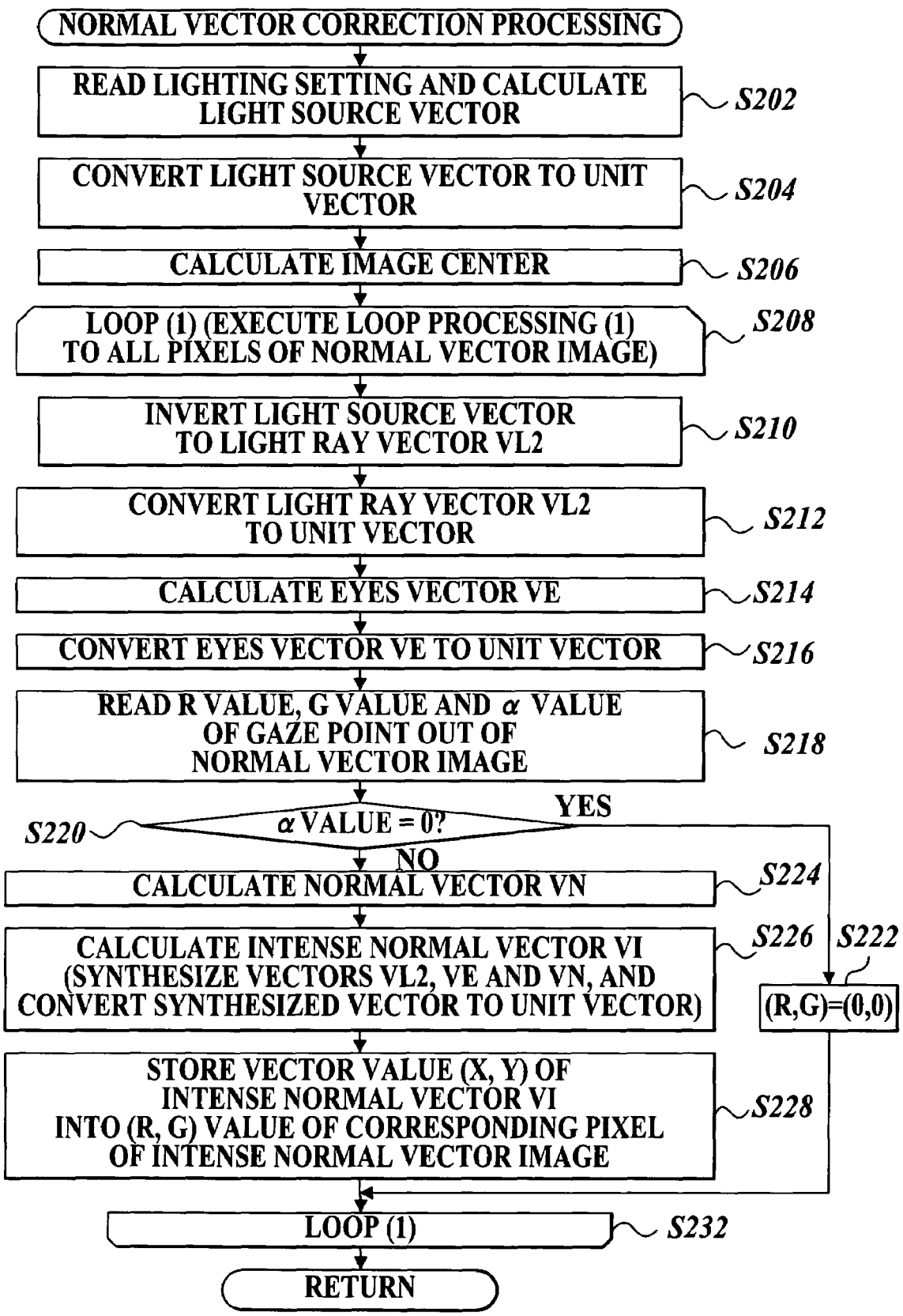
FIG. 16 is a flowchart for explaining the flow of normal vector correction processing in the first embodiment.

FIG. 16 is a flowchart for illustrating the flow of the normal vector correction processing of the present embodiment. As shown in FIG. 16, the normal vector correction unit 224 first refers to the lighting setting 731, and calculates the light source vector (not shown) (Step S202). For example, the normal vector correction unit 225 can obtain the light source vector of a light source L by subtracting gaze point coordinates from the position coordinates of the light source L. After the light source vector have been calculated, the normal vector correction unit 224 converts the light source vector to a unit vector (Step S204).

Next, the normal vector correction unit 224 calculates the image center Ob (Step S206), and executes the following loop processing (1) to all of the pixels of the normal vector image (Step S208).

In the loop processing (1), the normal vector correction unit 224 first inverts the light source vector, and calculates the light ray vector VL2 indicating the direction of the light emitted form the light source (Step S210). Furthermore, the normal vector correction unit 224 converts the calculated light ray vector VL2 to a unit vector (Step S212).

Next, the normal vector correction unit 224 calculates a vector from the image center Ob to the pixel of the normal vector image 742 being the processing object. The normal vector correction unit 224 sets the calculated vector to be the eyes vector VE (Step S214), and further converts the eyes vector VE to a unit vector (Step S216).

Next, the normal vector correction unit 224 reads the R value, the G value and the α value of the pixel of the normal vector image 742 being the processing object out of the normal vector image 742 (Step S218). When the α value is "0" (Yes at Step S220), the normal vector correction unit 224 determines that a background is drawn at the gaze point position, and sets the R value and the G value to be "0" (Step S222). Further, the normal vector correction unit 224 sets the R value and the G value as the R value and the G value of the color information of the pixel of the intense normal vector image 744. When the α value is not "0" (No at Step S220), the normal vector correction unit 230 determines that an object is rendered at the gaze point position, and calculates the normal vector VN on the basis of the R value and the G value of the pixel of the normal vector image 742 (Step S224).

Next, the normal vector correction unit 224 synthesizes the light ray vector VL1, the eyes vector VE and the normal vector VN, and converts the resulted vector of the synthesis to a unit vector. Therefore, the normal vector correction unit 224 calculates the intense normal vector VI (Step S226).

After calculating the intense normal vector VI, the normal vector correction unit 224 stores the vector values (X, Y) are stored as the (R, G) values of the corresponding pixel of the intense normal vector image 744 (Step S228).

After executing the above-mentioned loop processing (1) to all pixels of the normal vector image 742 (Step S232), the normal vector correction unit 224 finishes the normal vector correction processing, and returns to the flow of FIG. 15.

In FIG. 15, the retouch operation unit 226 next executes the retouched image generation processing (Step S108).

Figure 17:
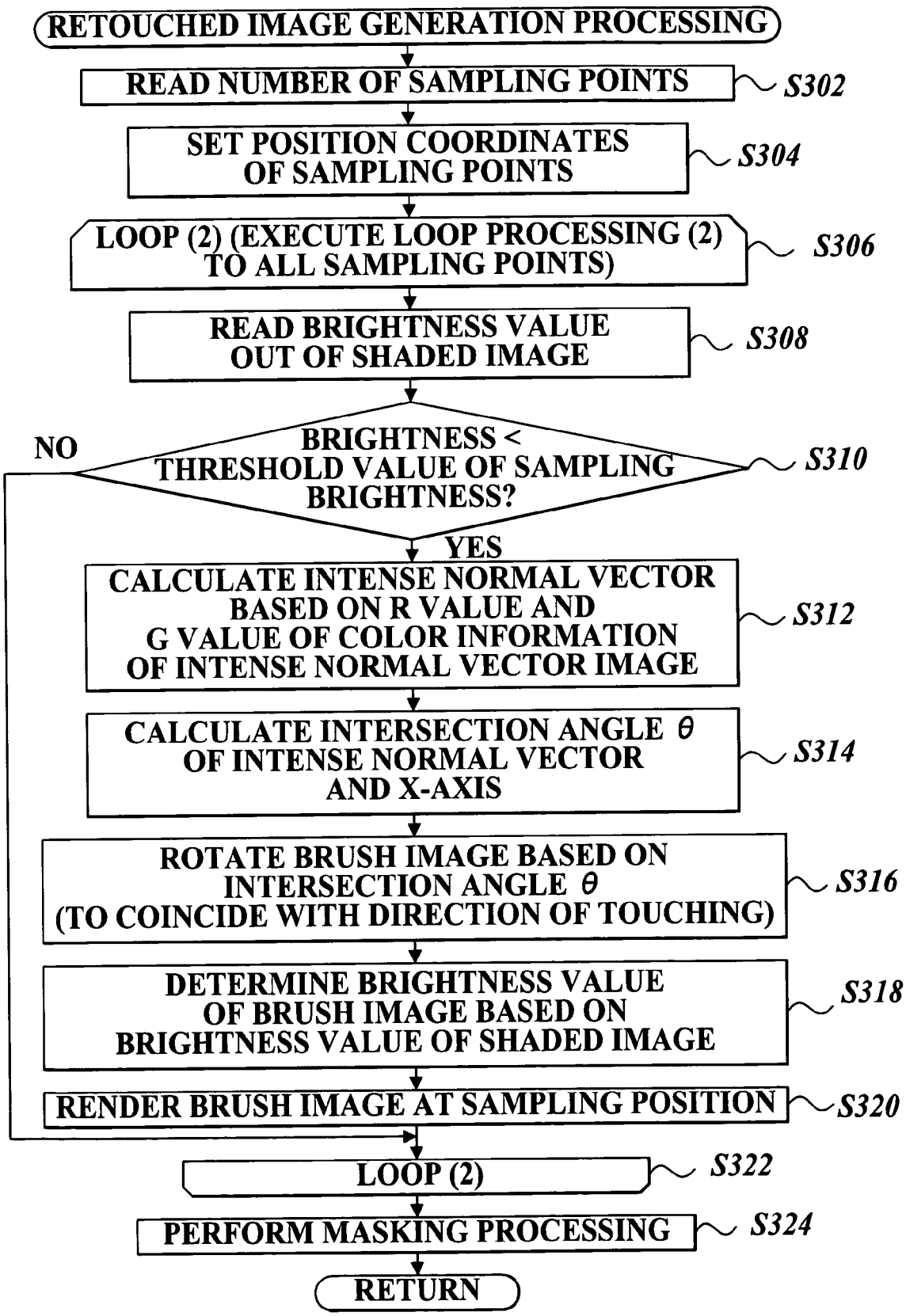
FIG. 17 is a flowchart for explaining the flow of retouched image generation processing in the first embodiment.

FIG. 17 is a flowchart for illustrating the flow of the retouched image generation processing in the present embodiment. As shown in FIG. 17, the retouch operation unit 226 first refers to the number of sampling points 732 (Step S302), and randomly sets the sampling points P on the screen coordinates (Step S304). The position coordinates of the set sampling points P are stored in the storage unit 70.

Then, the retouch operation unit 226 executes the following loop processing (2) to all of the set sampling points P (Step S306).

In the loop processing (2), the retouch operation unit 226 first reads the brightness at the coordinate position of the sampling point P out of the shaded image 740 (Step S308). When the brightness at the position of sampling point P is smaller than the threshold value of sampling brightness 733 (Yes at Step S310), namely when the brightness is darker than the brightness indicated by the threshold value, the retouch operation unit 226 reads the R value and the G value at the coordinate position of the sampling point P out of the intense normal vector image 744, and calculates the intense normal vector VI (Step S312).

Next, the retouch operation unit 226 calculates the intersection angle θ formed by the intense normal vector VI and the X-axis of local coordinates of the virtual view point C is calculated (Step S314), and rotates the brush image 734 on the basis of the intersection angle θ so that the brush direction VS coincides with the intense normal vector VI (Step S316).

Then, the retouch operation unit 226 reads the brightness at the coordinate position of the sampling point P out of the shaded image 740, determines the brush image 734 at the brightness based on the brightness read out of the shaded image 740 (Step S318) and renders the brush image 734 at the position of the sampling point P (Step S320).

After rendering the brush images at all of the sampling points P (Step S322), the retouch operation unit 226 refers to the α value of the intense normal vector image 744 for performing masking processing, and deletes the part of the brush image 734 which is drawn in the place where the object A is not rendered by means of the intense normal vector image 744 (Step S324).

By the structure and the processing described above, retouched images can be produced at higher speed on the basis of the three-dimensional model data of the object to be an object.

[Structure of Hardware]

Figure 30:
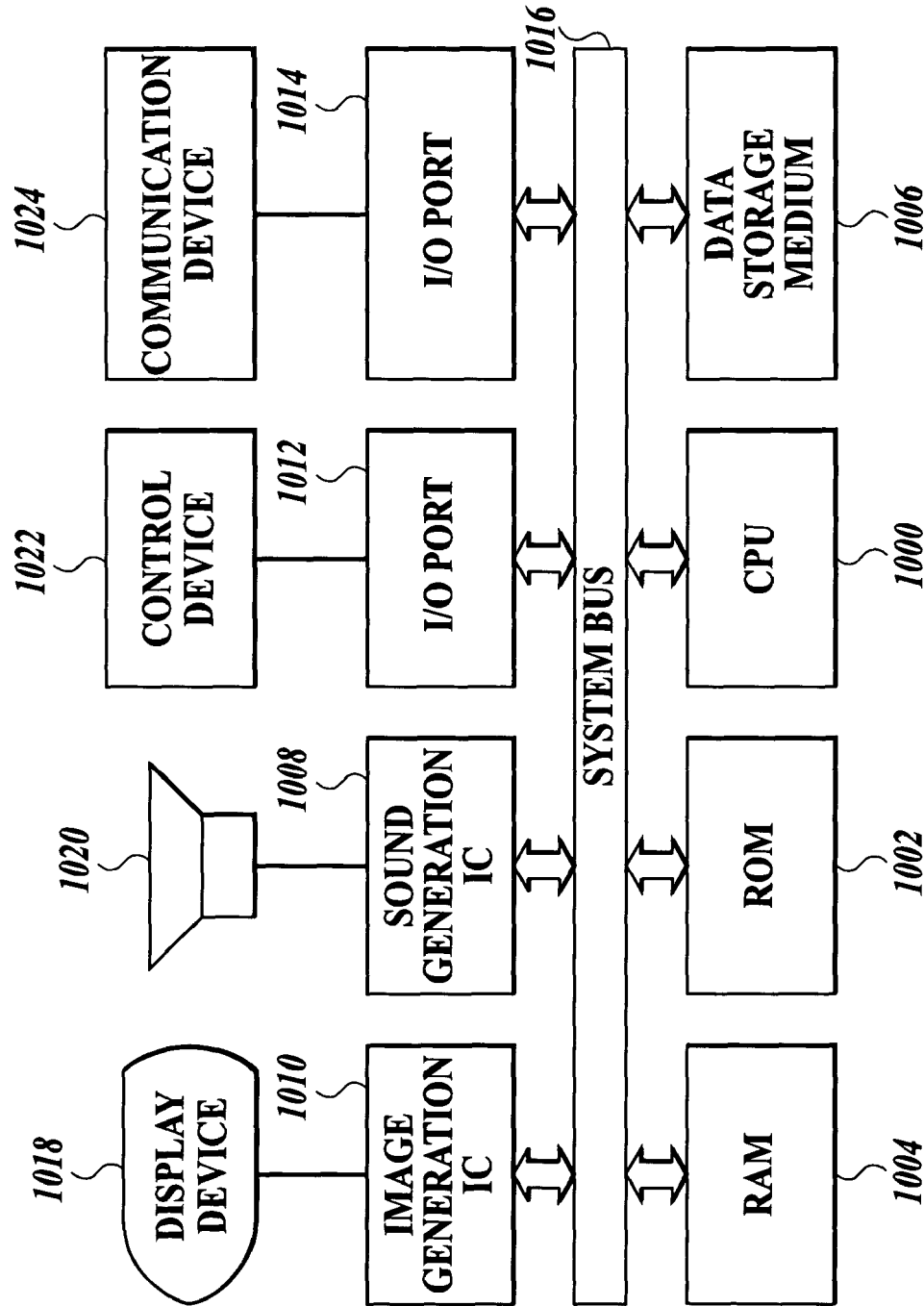
FIG. 30 is a view showing an example of a hardware structure for realizing the image generating apparatus 1100 of the first embodiment.

FIG. 30 is a diagram showing an example of the hardware structure realizable of the image generating apparatus 1100 in the first embodiment. The image generating apparatus 1100 comprises a CPU 1000, a ROM 1002, a RAM 1004, a data storage medium 1006, a sound generation IC 1008, an image generation IC 1010, and I/O ports 1012 and 1014, that are interconnected by a system bus 1016 so that data can be exchanged therebetween.

The CPU 1000 is equivalent to the processing unit 20 shown in FIG. 2. The CPU 1000 controls the whole apparatus and performs various data processing, according to programs stored in the data storage medium 1006, the system program stored in the ROM 1002, the operation signal inputted through the control device 1022, or the like.

The ROM 1002, the RAM 1004 and the data storage medium 1006 are equivalent to the storage unit 70 shown in FIG. 2.

The ROM 1002 is equivalent to the storage device 1114 shown in FIG. 1, and stores programs or data predetermined for the image generation information 72. The RAM 1004 is storage means used as a work area or the like, for the CPU 1000. The RAM 1004 stores given data stored in the data storage medium 1006 or the ROM 1002, or results of the operation performed by the CPU 1000, therein. The data storage medium 1006 is equivalent to the CD-ROM 1118 shown in FIG. 1. The data storage medium 1006 is realized by an IC memory card, a hard disc unit capable of being attached to or detached from the apparatus, a MO or the like. The data storage medium 1006 have a structure so as to store data stores in the ROM 1002, and read and use the data as the occasion may demand.

The sound generation IC 1008 is an integrated circuit for generating operation sounds on the basis of data stored in the data storage medium 1006 or the ROM 1002. The sounds generated by the sound generation IC 1008 are outputted from the speaker 1020. The speaker 1020 is incorporated in, for example, the monitor 1104 or the apparatus body 1110 shown in FIG. 1.

The image generation IC 1010 is an integrated circuit for generating pixel data required to output the images to the display device 1018, on the basis of image data outputted from the RAM 1004, the ROM 1002, the data storage medium 1006 or the like. The display device 1018 is equivalent to the image display unit 30 shown in FIG. 2 or the display 1104 shown in FIG. 1.

The control device 1022 is connected to the I/O port 1012, and the communication device 1024 is connected to the I/O port 1014.

The control device 1022 is equivalent to the operation input unit 10 shown in FIG. 2. The control device 1022 corresponds to the operation panel, the keyboard 1106 or the mouse 1108 shown in FIG. 1, or the like. Therefore, the control device 1022 is used so that a player inputs various game operations according to the progress of the game to the apparatus body.

The communication device 1024 is a device for communicating various data used by the apparatus body with an external device. When the apparatus is connected with another apparatus, the communication device 1024 is used for communicating predetermined data corresponding to the program, the program or other data with another apparatus, through the communications line. For example, the communication device 1024 is incorporated in the apparatus body 1110 shown in FIG. 1.

The processing performed by the image generation IC 1010, the sound generation IC 1008 or the like is performed by the CPU 1000, a general-purpose DSP or the like, as a software.

[Second Embodiment]

Next, a second embodiment to which the present invention is applied is described with reference to FIGS. 18 to 25C. In the present embodiment, the case where a plurality of retouched images which are supposed to be displayed as a moving image are generated will be described. Incidentally, the present embodiment can be basically implemented by means of the same constituent elements as those of the first embodiment. The same constituent elements as those of the first embodiment are designated by the same reference numerals as those of the first embodiment, and their descriptions are omitted.

[Description of Function Block]

Figure 18:
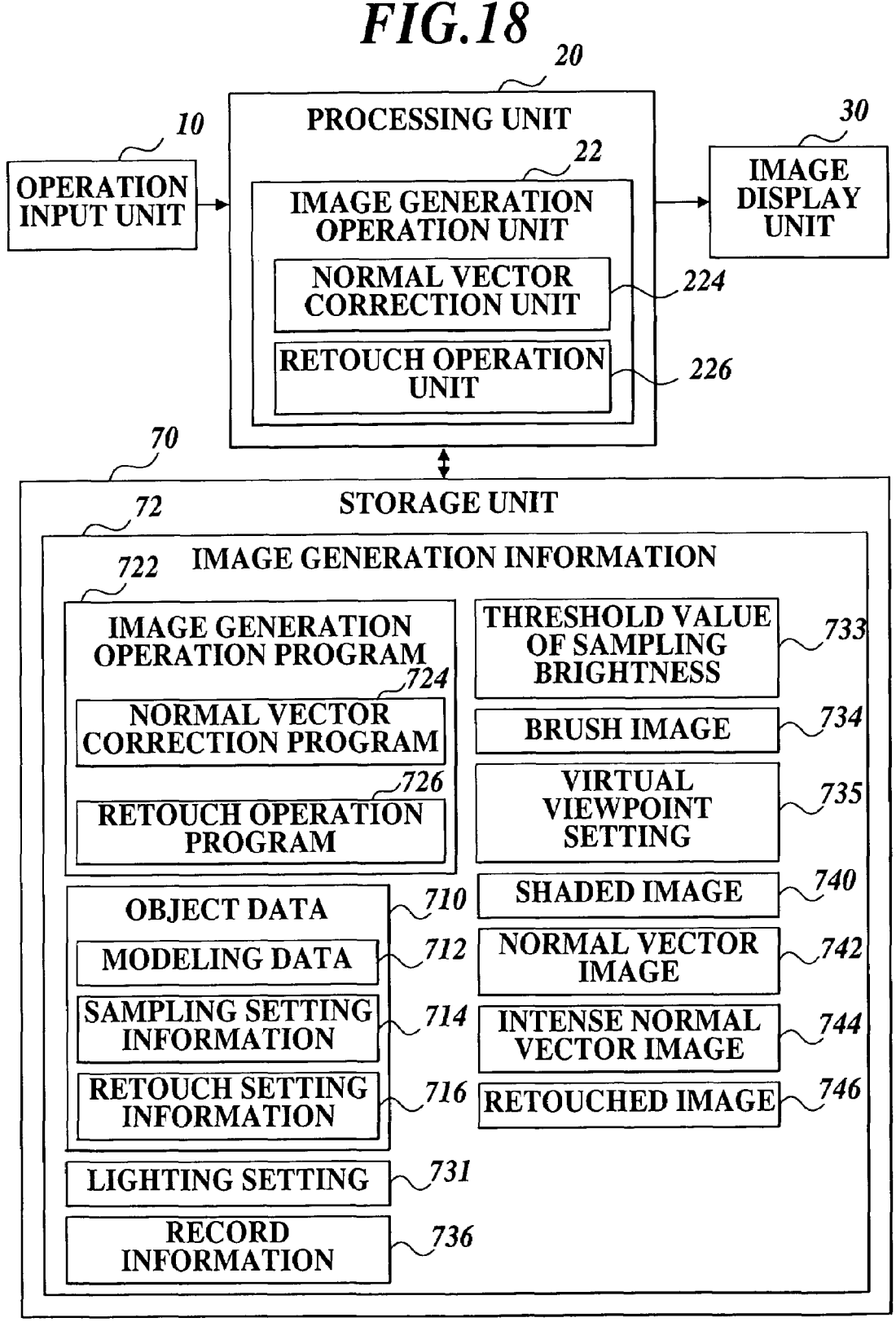
FIG. 18 is a functional block diagram showing an example of the functional structure of the image generating apparatus 1100 in a second embodiment.

FIG. 18 is a function block diagram showing an example of the function structure of the present embodiment. The object data 710 of the storage unit 70 in the present embodiment includes modeling data 712 for storing three-dimensional data of the modeling of the object, color information of the object, or the like; sampling setting information 714 for storing the information for determining the sampling point P corresponding to the position of the touch added to the object; and retouch setting information 716 for setting information on the rendering method of the brush image 734 to the sampling point P.

FIG. 19 is a view showing an example of the data structure of the sampling setting information 714.

An object ID 714a is identification information on the sampling setting information 714. The object ID 714a stores, for example, a name of an object and a file name.

A sampling image 714b specifies image data for obtaining information of the vector indicating the direction of the object surface in the XY-plane of the screen coordinates at the time of rendering the brush image 734. In the present embodiment, because the brush images 734 are rendered on the direction of the intense normal vectors VI, the intense normal vector image 744 is the default. However, the normal vector image 742 can be appropriately set.

The sampling type 714c sets the method for arranging the sampling points P. In the present embodiment, a grid type arrangement method for setting the sampling points P in a grid state and a random type arrangement method for setting the sampling points P in a random state can be selected. The total number of the sampling points P to be set is stored in a sampling number 714g.

Figure 21A:
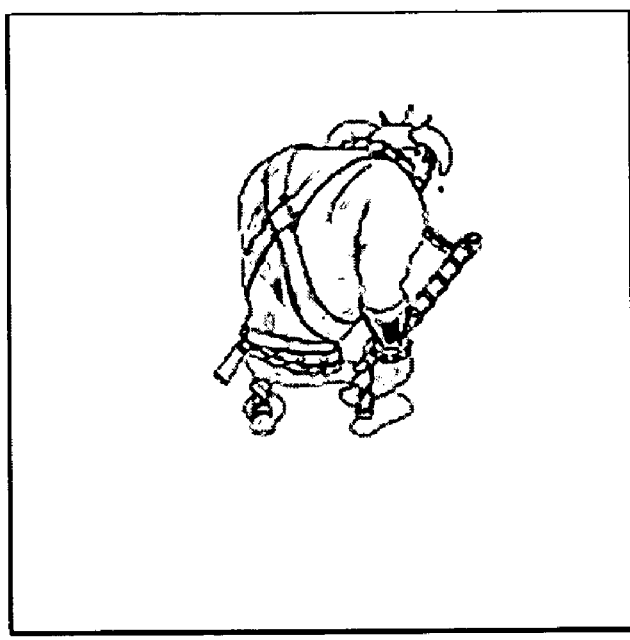
FIGS. 21A and 21B are views showing examples of retouched images 746 having different sampling types.
Figure 21B:
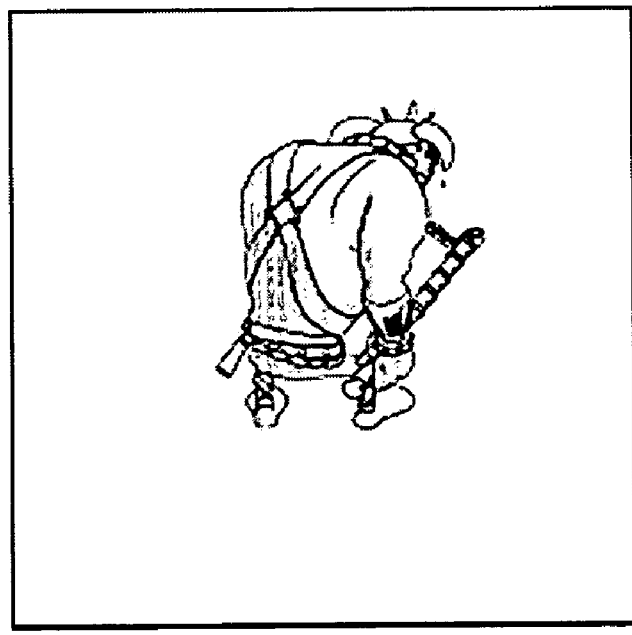

FIGS. 21A and 21B are views showing examples of the retouched images 746 having different sampling types. Incidentally, edges are added to the retouched images 746 for the sake of convenience. FIG. 21A shows the retouched image 746 according to the random type arrangement method, and touches are irregularly rendered. On the other hand, FIG. 21B shows the retouched image 746 according to the grid type arrangement method, and touches are regularly rendered. The grid type arrangement method is effective in making the impression of a canvas-like comparatively regular texture painting material.

When the sampling type 714c of FIG. 19 is set to the random type, it is possible to set the scope in which the sampling points P are set by means of a random pattern 714d.

FIGS. 22A and 22B are conceptual diagrams for illustrating the random patterns 714d in the present embodiment. As shown in FIGS. 22A and 22B, for example in the grid type of FIG. 22A, the sampling points P are set in a grid state. In the random type I of FIG. 22B, the sampling points P are randomly set in the whole screen coordinates. In the random type II of FIG. 22B, the sampling points P are randomly set only in the part in which the object A is rendered of the screen coordinates. The part in which the object A is rendered is discriminated, for example, referring to the α value of the normal vector image 742. In the random type III of FIG. 22B, the sampling points P are randomly set only in the part in which the object A is rendered of the screen coordinates. Further, in the random type III, with reference to the brightness values at the positions of the sampling points P on the basis of the shaded image 740 (iso-brightness curves are displayed as broken lines as standard), the sampling points P having brightness values meeting a predetermined condition (for example, larger or smaller than the threshold value of sampling brightness 733, or the like) are made to be effective. In the random type IV in FIG. 22B, with reference to the brightness values at the positions of the sampling points P of the shaded image 740 previously, all of the sampling points P are set in the scope in which the brightness values meet the predetermined condition.

A sampling curve 714e in FIG. 19 sets the types of sampling functions (filters) to be used at the time of the referring to the brightness of the shaded image 740 in the random types III and IV of the random pattern 714d.

FIGS. 23A, 23B, 23C, and 23D are views for illustrating the concept of the sampling functions set by the sampling curve 714e. The sampling functions receive the brightness read out of the shaded image 740 as their input, and outputs values calculated in accordance with predetermined functions.

Figure 23A:
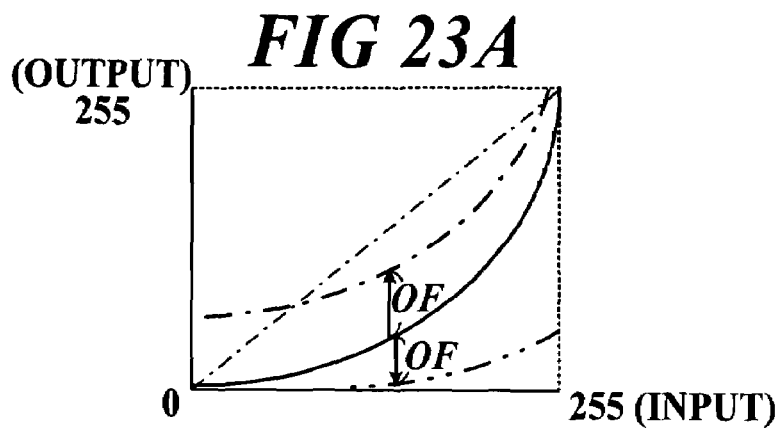
FIGS. 23A, 23B, 23C, and 23D are views for explaining the concept of sampling functions set by sampling curves.
Figure 23B:
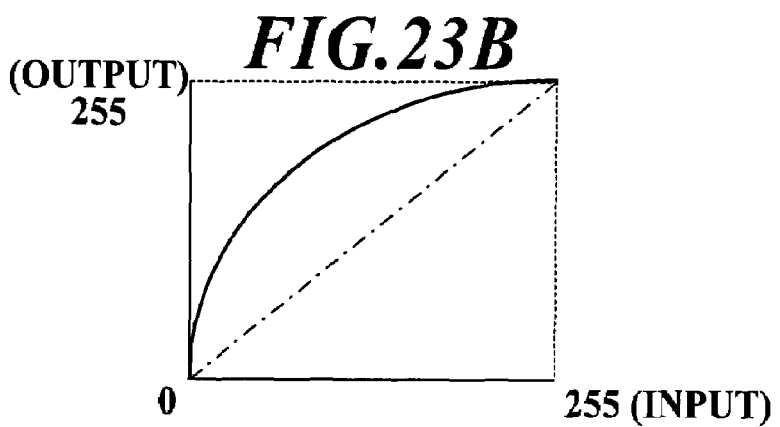
Figure 23C:
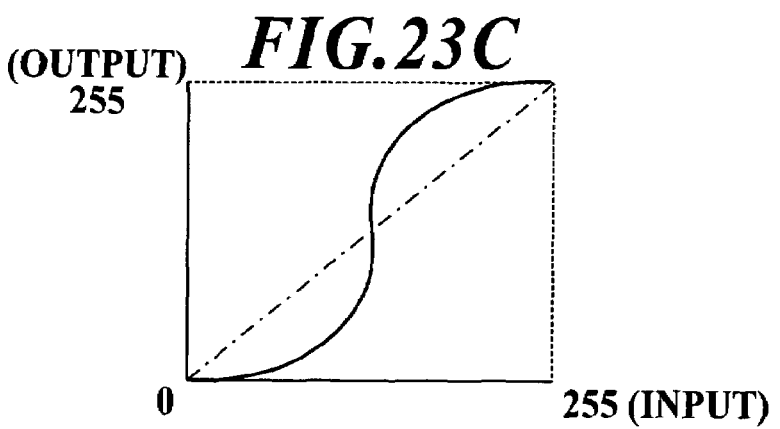
Figure 23D:
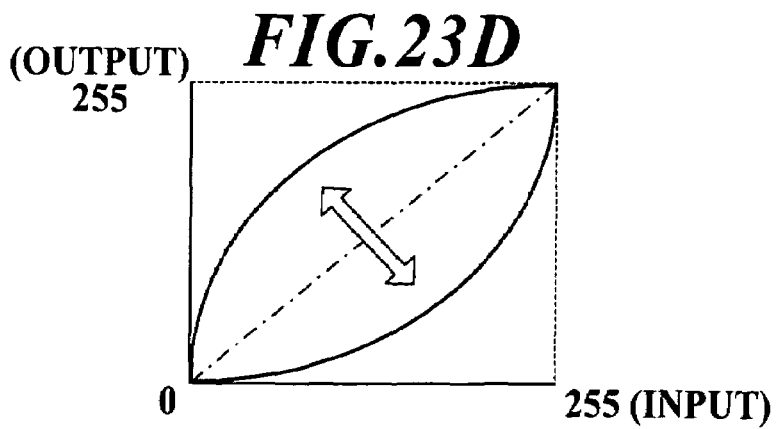

In FIG. 23A, the values of the brightness capable of being obtained from the shaded image 740 are output to be lower. Consequently, the sampling points P are set also in comparatively bright positions of the shaded image 740, and touches are added to such positions also. In FIG. 23B, the values of the brightness is output to be higher on the contrary. Consequently, the sampling points P are set in comparatively dark positions of the shaded image 740, and touches are added to such positions. In addition, the sampling function may be set as in FIGS. 23C and 23D. FIG. 23D shows the setting in which the characteristic of the function further randomly varies.

In order to determine the sampling point on the basis of the brightness of the shaded image 740 in the random types III and IV of the random pattern 714d, the sampling point is determined on the basis of the output values of the sampling function.

In the present embodiment, a plurality of sampling functions which can be set by the sampling curve 714e are previously prepared. Therefore, any one of the plurality of sampling functions is suitably selected according to the characteristic of the object or the environmental condition (for example, an image of a character, the light state of the environment in which the character enters, or the like).

A sampling curve offset quantity 714f sets offset quantity OF of the sampling function (see FIG. 23A). For example, in case of the offset in the plus direction, the brightness of the shaded image 740 equal to certain brightness or more, or equal to certain brightness or less is output as "0".

Figure 24A:
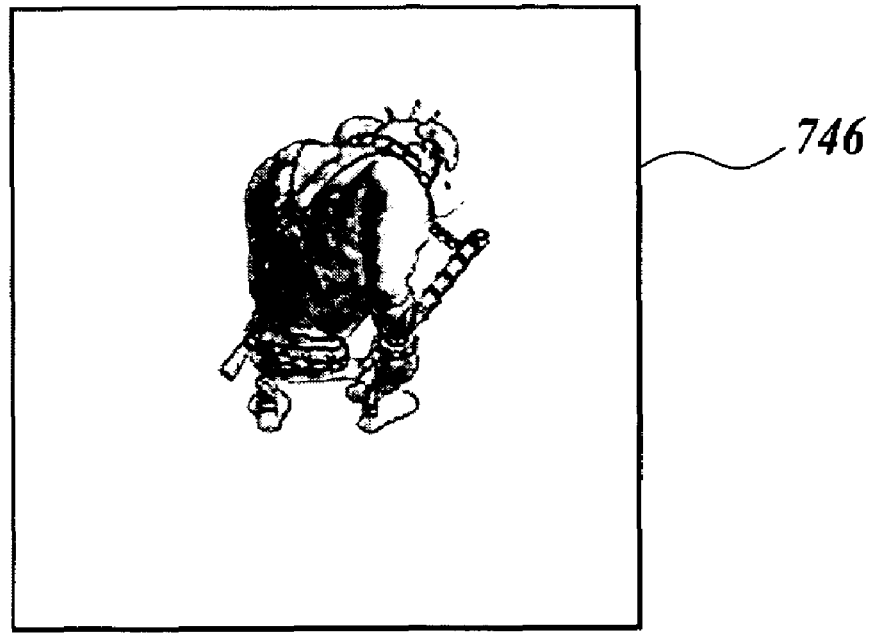
FIGS. 24A and 24B are views showing examples of the retouched images 746 which are based on the same shaded image and have different sampling curve offset quantities.
Figure 24B:
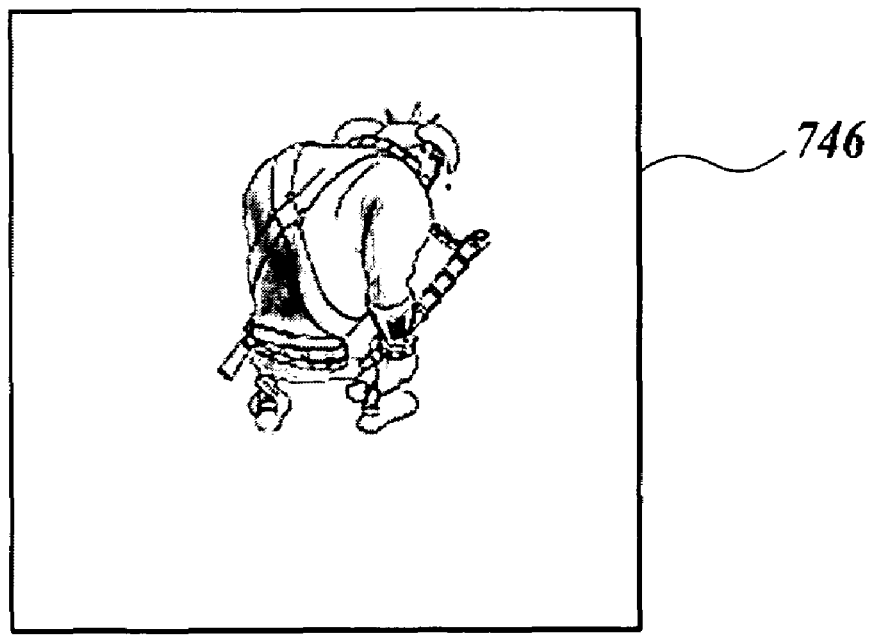

FIGS. 24A and 24B are views showing examples of the retouched images 746 which are based on the same shaded image 740 and have different sampling curve offset quantity 714f. Incidentally, edges are added to the retouched images 746 for the sake of convenience. FIG. 24A shows the case where the offset quantity is zero, and FIG. 24B shows the case where the offset quantity is three. In the case of FIG. 24B, values relatively higher than input values are output owing to the offset in the plus direction. Consequently, by determining whether the sampling points P are set on the basis of the same brightness as a boundary value, a bright tone of handwriting style NPR image having increased touches can be generated.

FIG. 20 shows a view showing an example of the data structure of the retouch setting information 716 in the present embodiment. The retouch setting information 716 is set for every retouched image to be generated.

An object ID 716a is identification information of the sampling setting information 714. The object ID 716a stores, for example, a name of the object or a file name.

The using brush 716b specifies the brush image 734 to be rendered as a touch.

A brush size 716c sets a scaling ratio at the time of rendering the brush image 734.

A brush roll 716d sets the offset value of rotation quantity of the brush image 734 when the retouch operation unit 226 adjusts the direction of the brush image 734 to the direction of the intense normal vector VI (or the normal vector VN in case of some setting of the sampling image 714b).

Figure 25A:
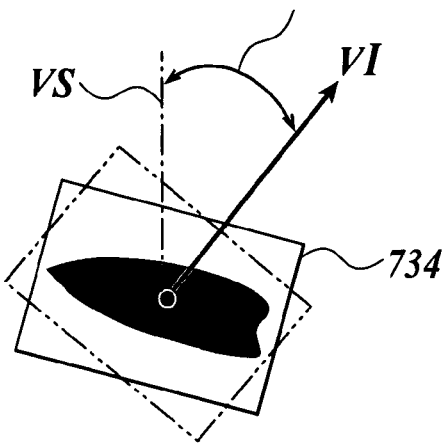
FIGS. 25A, 25B and 25C are views for explaining the concept of a brush roll.
Figure 25B:
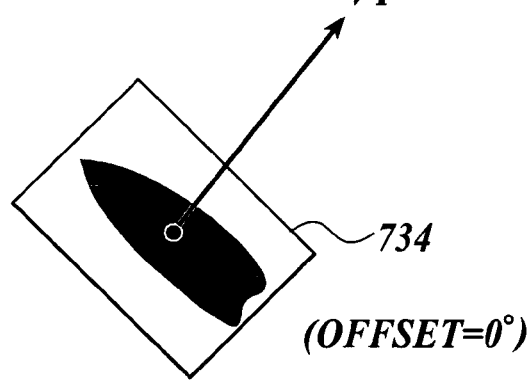
Figure 25C:
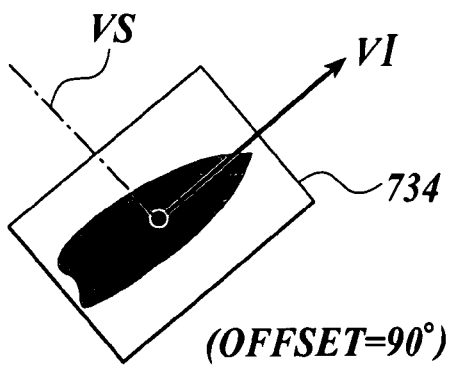

FIGS. 25A, 25B and 25C are views for illustrating the concept of the brush roll 716d. As shown in FIG. 25A, the brush direction VS of the brush image 734 is shifted from the direction of the intense normal vector VI by the offset quantity. By setting the brush roll 716d adequately, it is possible to give a plurality of touch expressions such as the state of using a flat brush vertically (FIG. 25B), the state of using the flat brush horizontally (FIG. 25C) or the like.

A brush repeat number 716e in FIG. 20 sets the number of times of rendering the brush images 734 to one sampling point P. At that time, the degree of shifting each brush image 734 for rendering it is determined in order that the brush repeat number 716e may be included within the scope set by a brush movement range 716f, and then the rendering position coordinates of each brush image 734 are suitably increased or decreased. In case of FIG. 20, the brush images 734 are rendered at rendering positions changed so as to render the brush image 734 three times and place a part of one of the brush images 734 upon another brush image 734, within the scope of 15 pixels in the direction of the intense normal vector VI from the position coordinates of one sampling point P as a starting point.

Figure 26:
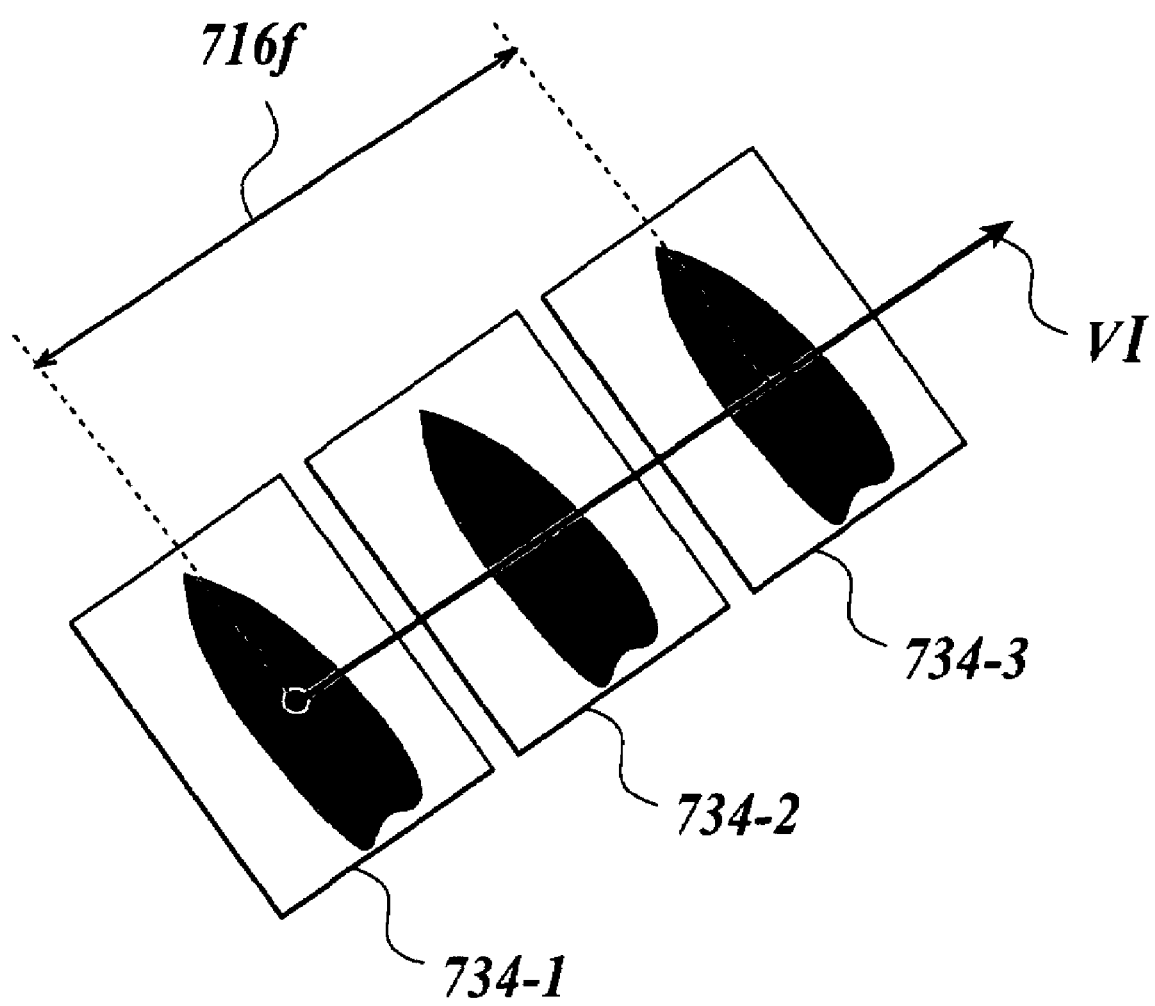
FIG. 26 is a view for explaining the concept of brush repeating.

FIG. 26 is a view for illustrating the concept of the brush repeating. As shown in FIG. 26, the brush images 734 are rendered in order that a part of one of the brush images 734 may be placed upon another brush image 734 to one sampling point P. Because the plurality of brush images 734 can be rendered at a time, the processing can be performed at high speed, and further sufficient touches can be expressed without setting the sampling number 714g to be so large.

In the present embodiment, the relative position at which the brush image 734 is rendered to the sampling point P can be randomly changed (shifted) as time passes by means of a random setting method 716g, a position offset range 716h, a position offset variation 716j and a rotation offset range 716k in FIG. 20.

The random setting method 716g sets a condition of using a random number generation function continuously. For example, in the present embodiment, the random setting method 716g can set "Every Mode" for using the different random number generation function every when generating the retouched image, "Frame Mode" for using the same random number generation function in the same frame of the moving image, and "Scene Mode" for using the same random number generation function for one scene. Incidentally, the frame number or the scene number necessary hereupon is suitably counted in record information 736.

The position offset range 716h specifies an offset scope common to both of the X-axis and the Y-axis of the position at which the brush image 734 is rendered to the sampling point P. In case of FIG. 20, the brush image 734 is rendered at the position offset within the scope of plus five pixels and minus five pixels from the sampling point P in both of the X-axis direction and the Y-axis direction. The position offset variation 716j further sets an offset value for every frame.

The rotation offset range 716k specifies an offset scope of the relative angle of the brush image 734 to the sampling point P. That is, the rotation offset range 716k provides random variations to the brush roll 716d.

Consequently, because the position at which the brush image 734 is rendered is changed slightly for every frame, it is possible to express the image so that a viewer feels that a shift or fluctuation of the rendering position is caused owing to handwriting.

Consequently, when the position offset range 716h, the position offset variation 716j and the rotation offset range 716k are set to be large, the difference between frames in positions of touches becomes larger. Thereby, it is possible to produce handwriting style touches which can make powerful and rough-planed impression. Conversely, when their values are set to be small, the difference between frames in positions of touches becomes smaller. Thereby, it is possible to produce touches which can make smooth and fine impression.

Further, in the present embodiment, the color information for rendering the brush image 734 can be set.

A color sampling material 716m specifies image data used for determining rendering colors of the brush image 734 when rendering the brush image 734 at the sampling point P. In the present embodiment, "NONE" which specifies the shaded image 740 as the sampling material is the default. In this case, the brush image 734 is rendered on the basis of a brush color 716r. In addition, for example, when image data of a predetermined texture of paper or sheet are specified as the sampling material, it is also possible to provide rub impression for the handwriting style touch.

A color sampling curve 716n sets a sampling function for changing color information obtained from the image data specified by the color sampling material 716m. For example, the obtained color information is corrected in accordance with a predetermined function, and thereby the light and shade are emphasized, equalized or the like. The sampling function has characteristics similar to those shown in FIGS. 23A–23D.

A curve offset 716p sets the offset value of the sampling function set by the color sampling curve 716n. A brush color 716r sets specific color information to be given to the brush image 734. The brush color 716r sets black as the default. However, when the brush color 716r sets, for example, red, a touch in red can be added. A color number 716s sets color gradation of the brush image 734. That is, the color information obtained by the sampling function set by the color sampling curve 716n is further converted to specified color gradation.

[Description of Flow of Processing]

Figure 27:
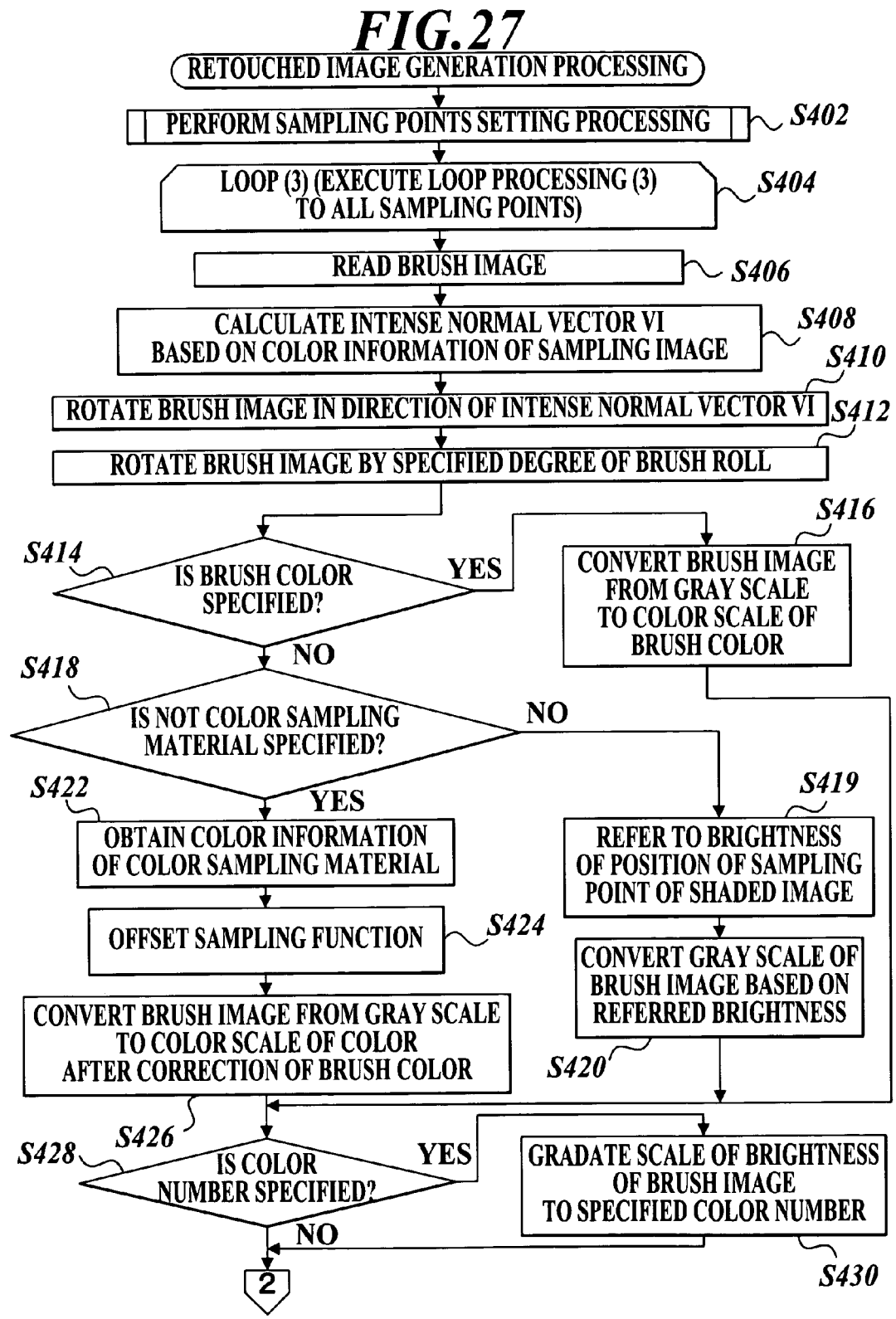
FIG. 27 is a flowchart for explaining the flow of retouched image generation processing of the second embodiment.
Figure 28:
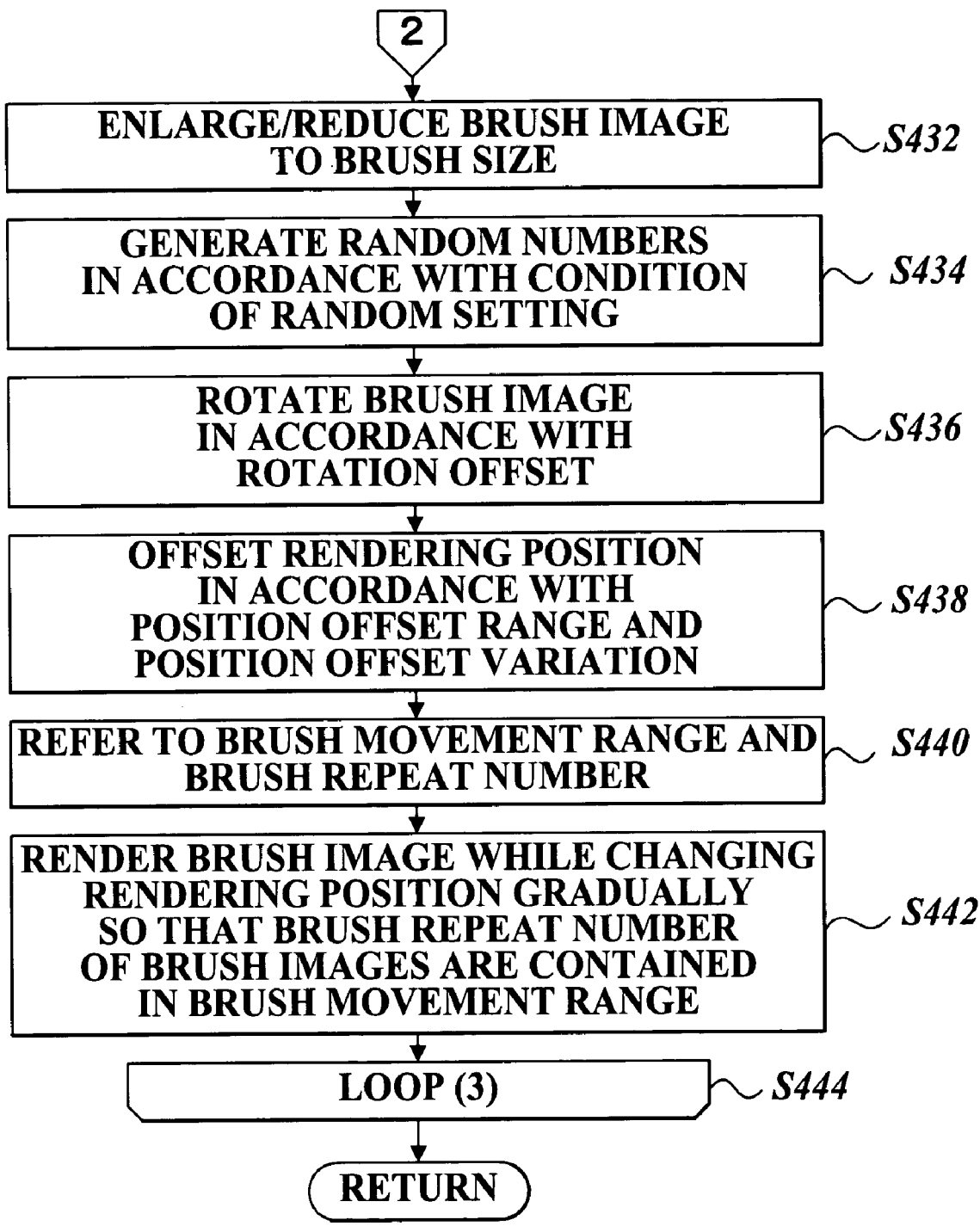
FIG. 28 is a flowchart for explaining the flow of the retouched image generation processing of the second embodiment.

FIGS. 27 and 28 are flowcharts for illustrating the flow of the retouched image generation processing of the present embodiment.

First, the retouch operation unit 226 determines sampling points P corresponding to positions at which touches are added.

The retouch operation unit 226 referred to the sampling setting information 714, and executes sampling points setting processing to set the sampling points P on the screen coordinates (Step S402). The position coordinates of the sampling points P are stored in the storage unit 70.

Figure 29:
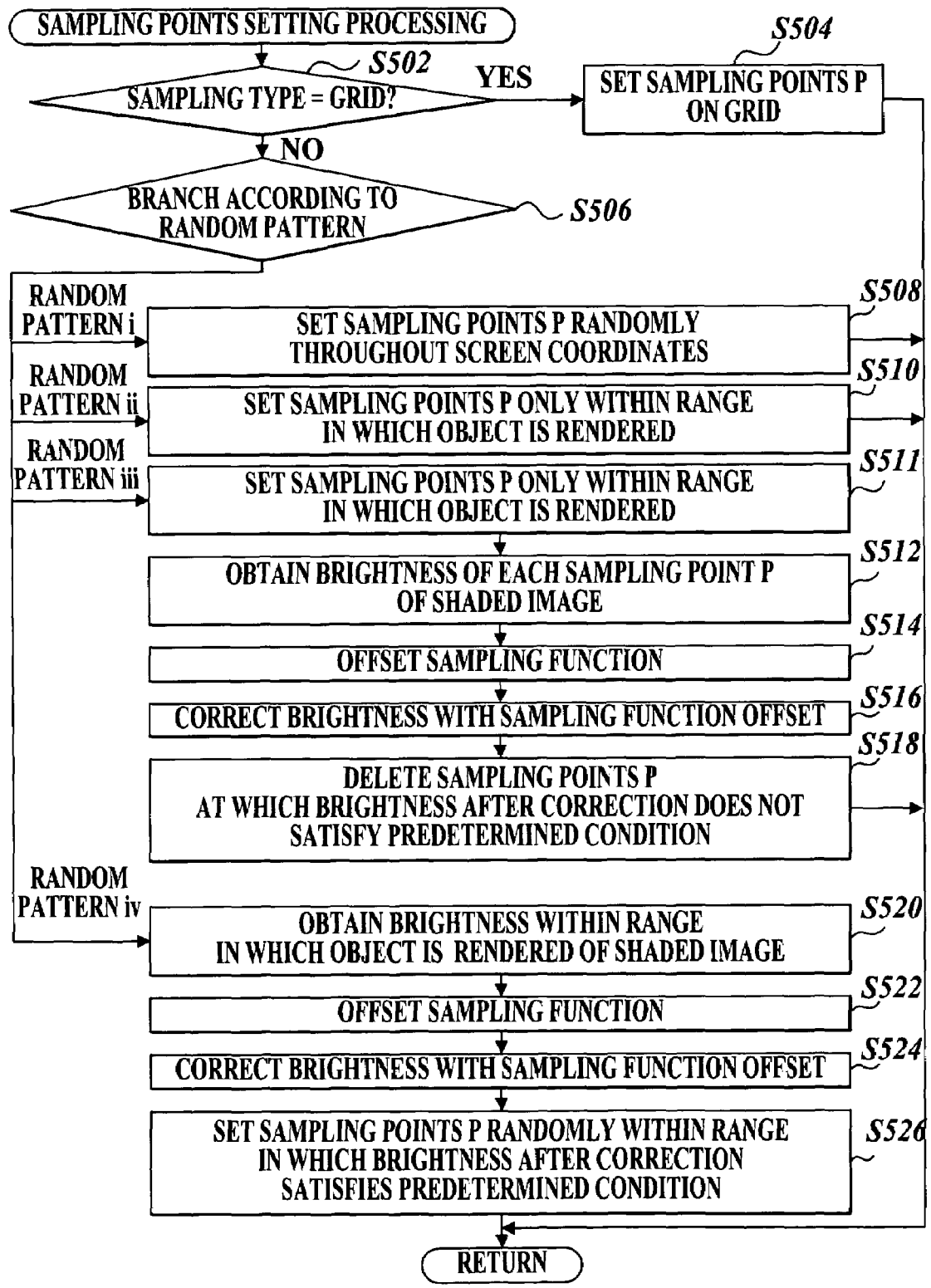
FIG. 29 is a flowchart for explaining the flow of sampling points setting processing of the second embodiment.

FIG. 29 is a flowchart for illustrating the sampling points setting processing in the present embodiment. As shown in FIG. 29, when the sampling type 714c is specified to be "grid" (Yes at Step S502), the retouch operation unit 226 sets the sampling number 714g of sampling points P on a predetermined grid in the screen coordinates (Step S504).

When the sampling type 714c is specified to be "random" (No at Step S502), the retouch operation unit 226 further refers to the random pattern 714d (Step S506).

When the random pattern 714d is the random pattern I, the retouch operation unit 226 randomly sets the sampling points P throughout the screen coordinates in accordance with conditions (Step S508).

When the random pattern 714d is the random pattern II, the retouch operation unit 226 sets the sampling points P only within the range in which the object is rendered (Step S510). The range is determined with reference to, for example, the α value of the intense normal vector VI.

When the random pattern 714d is the random pattern III, the retouch operation unit 226 sets the sampling points P only within the range in which the object is rendered (Step S511), and obtains the brightness of the shaded image 740 at each of the sampling points P (Step S512). Then, the retouch operation unit 226 offsets the sampling function specified by the sampling curve 714e in accordance with the sampling curve offset quantity 714f (Step S514), and corrects the brightness obtained from the shaded image 740 in accordance with the offset sampling function (Step S516). Then, the retouch operation unit 226 deletes the sampling points P having the corrected brightness which does not satisfy the predetermined condition (for example, being larger or smaller than the threshold value of brightness, or the like) (Step S518).

When the random pattern 714d is the random pattern IV, the retouch operation unit 226 obtains the brightness within the range in which the object is rendered is obtained of the shaded image 740 (Step S520), offsets the sampling function specified by the sampling curve 714e in accordance with the sampling curve offset quantity 714f (Step S522), and corrects the brightness obtained from the shaded image 740 in accordance with the offset sampling function (Step S524). Therefore, the retouch operation unit 226 sets the sampling points P within the range in which the corrected brightness satisfies the predetermined condition (Step S526).

After the retouch operation unit 226 sets the sampling points P, the retouch operation unit 226 finishes the sampling points setting processing and returns to the flow of FIG. 27.

In FIG. 27, the retouch operation unit 226 executes the following loop processing (3) to all of the sampling points P set by the sampling points setting processing (Step S404).

In the loop processing (3), the retouch operation unit 226 first prepares the brush image 734 for rendering touches. The retouch operation unit 226 refers to the using brush 716b, and reads the brush image 734 (Step S406). Next, the retouch operation unit 226 refers to the image specified by the sampling image 714b (the intense normal vector image in this case), reads the color information at the position of the sampling point P, and calculates the intense normal vector VI (Step S408).

After obtaining the intense normal vector VI, the retouch operation unit 226 rotates the brush image 734 in order that the brush direction VS may coincide with the intense normal vector VI (Step S410). At the time of the rotation, the retouch operation unit 226 rotates the brush image 734 by the rotation quantity of the brush roll 716d (Step S412). Therefore, the basic brush direction has been determined.

Next, the color (rendering color) for rendering the brush image 734 will be determined.

When the brush color 716r is specified (Yes at Step S414), the retouch operation unit 226 converts the gray scale of the brush image 734 to the color scale of the brush color 716r (Step S416). For example, when yellow is specified by the brush color 716r, the brush image 734 becomes the color scale based on the light and shade of the specified yellow. When the brush image 734 having the converted color scale is rendered, the touch becomes the yellowish light and shade.

When the brush color 716r is not specified (No at Step S414) and the color sampling material 716m is not specified ("NONE") (NO at Step S418), the retouch operation unit 226 refers to the brightness of the shaded image 740 at the position of the sampling point P (Step S419), and converts the gray scale of the brush image 734 on the basis of the referred brightness (Step S420). That is, although the brush image 734 remains as the gray scale image, the brush image 734 is shifted to the gray scale according to the brightness of the shaded image 740 at the position of the sampling point P. When the brush image 734 having the converted brightness is rendered, the touch becomes the light and shade according to the shaded image 740.

When the color sampling material 716m species a specific image (YES at Step S418), the retouch operation unit 226 obtains the color information of the specified image at the point of the sampling point P (Step S422), and offsets the sampling function specified by the color sampling curve 716n in accordance with the curve offset 716p (Step S424). Then, the retouch operation unit 226 converts the gray scale of the brush image 734 to the color scale on the basis of the values of the color information corrected by the offset sampling function (Step S426).

Hereupon, when the color number capable of being rendered is specified by the color number 716s (Yes at Step S428), the retouch operation unit 226 gradates the scale of the brightness of the brush image 734 to the specified color number (Step S430). That is, the brightness of the brush image 734 becomes a stepwise scale. When the brush image 734 having the converted scale is rendered, the touch becomes like the cell animation style in which the number of colors is limited.

Next, the retouch operation unit 226 determines the size of rendering the brush image 734 having the determined rendering color and the quantity of shifting the rendering position of the brush image 734 to the sampling point P, and renders the brush image 734 (FIG. 28). First, the retouch operation unit 226 refers to the brush size 716c, and enlarges or reduces the brush image 734 (Step S432). Next, the retouch operation unit 226 determines the random number generation function in accordance with the condition of the random setting method 716g, and generates random numbers (Step S434). The retouch operation unit 226 rotates the brush image 734 in accordance with the rotation offset range 716k on the basis of the random numbers (Step S436). Then, the retouch operation unit 226 calculates the offset quantity of the X-direction and the Y-direction from the position coordinates of the sampling point P in accordance with the position offset range 716h and the position offset variation 716j, and offsets the rendering position (Step S438).

After determining the rendering position, the retouch operation unit 226 refers to the brush movement range 716f and the brush repeat number 716e (Step S440). Then, while changing the rendering position gradually in order that the brush repeat number 716e of brush images 734 may be contained in the brush movement range 716f, the retouch operation unit 226 renders the brush images 734 on the retouched image 746 (Step S442).

The retouch operation unit 226 executes the above-mentioned loop processing (3) to all of the sampling points P (Step S444), and then finishes the retouched image generation processing.

As described above, according to the second embodiment, a plurality of retouched images 746 wherein the brush images 734 are rendered in slightly different positions can be generated. Consequently, when the present invention is applied to a moving image, it is possible to express a shift or fluctuation of the rendering position as if it is caused owing to handwriting. Further, because the rendering colors of the brush images 734 can be set, it is possible to generate the retouched images 746 which are expressed more variously.

Although the present invention has been explained according to the above-described first and second embodiments, it should also be understood that the present invention is not limited to the first or second embodiment and various additions, changes and modifications may be made to the invention without departing from the gist thereof.

For example, the image generating apparatus 1100 is not limited to a stand-alone apparatus, but may be configured to be realized by dispersing functions to a plurality of apparatus connected to a network.

Further, the sampling number 714g is not limited to be fixed, but may be suitably changeable. To put it more concretely, for example, when the sampling points setting processing is executed, the distance from the image center Ob of the object A to the virtual viewpoint C is first calculated, and then the sampling number 714g is changed in proportion to the distance.

Thereby, when the object A is arranged at a position distant from the virtual viewpoint C and the area in which the object A is rendered is small on the screen, touches are superposed on one another to be meaningless even if many touches are added. Accordingly, the sampling number 714g is reduced to a suitable number according to the distance, and thereby the load of processing is reduced. Conversely, when the object A is arranged near the virtual viewpoint C and the area in which the object A is rendered becomes large on the screen, the shortage of the touches can be supplemented by increasing the sampling number 714g.

Further, the brush size 716c is not limited to be fixed, but may be variable. For example, in Step S437 of the retouched image generation processing, the distance from the image center Ob to the virtual viewpoint C is calculated, and the brush size 716c is varied in proportion to the distance. Accordingly, it is possible to set the touches of the object A distant from the virtual viewpoint C to be fine, and to set the touches of the object A near the virtual viewpoint C to be large.

Further, as to the generation of various pieces of image data, the normal vector image 742 and the shaded image 740 are not always limited to be generated by the image generation operation unit 22. In case it is necessary for a long time to generate complicated models or the like, the normal vector image 742 and the shaded image 740 may be suitably prepared in advance to be used.

Further, the intense normal vector VI is not limited to be obtained on the basis of the normal vector image 742. It is needless to say that the normal vector VN may be read from, for example, the polygon data of the object suitably to be used as the intense normal vector VI.

According to the present invention, the normal information of the surface of the three-dimensional object is obtained from the normal image generated by irradiating the three-dimensional object with light emitted by the first light source and the second light source in two directions crossing at right angles with the eyes line direction, and the brush image is arranged at the arrangement angle along the surface of the three-dimensional object. Thereby, pictorial rendering is realized. The rendering processing of the normal image itself is the same as the known rendering processing, and can be executed by the hardware called as the so-called rendering engine such as a DSP or the like which is to be mounted in a general image generating apparatus. Consequently, it is possible to generate pictorial images at higher speed.

Further, when arranging the brush image, the arrangement angle of the brush image is determined in consideration of the light ray direction of the light source in the object space in which the three-dimensional object is arranged. Consequently, it is possible to generate images having no contradiction with regard to the light source in the object space.

The entire disclosure of Japanese Patent Application No. Tokugan 2002-274155 filed on Sep. 19, 2002 including specification, claims, drawings and summary are incorporated herein by reference in its entirety.

What is claimed is:

1. An image generating method for rendering a three-dimensional object viewed from a predetermined viewpoint by generating an image of the three-dimensional object and writing color information on the image generated in a rendering buffer, the method comprising:

operating a normal line to a surface of the three-dimensional object;

setting a plurality of sampling points within a rendering region for the three-dimensional object, the rendering region on which the three-dimensional object is projected on the basis of the predetermined viewpoint; and rendering the three-dimensional object by performing processing for determining an arrangement angle of a predetermined brush image on the basis of the normal line operated at a position on the surface of the three-dimensional object, the position corresponding to each of the plurality of sampling points, and arranging the predetermined brush image at the arrangement angle determined at the position corresponding to each of the plurality of sampling points in the rendering buffer.

2. The image generating method as claimed in claim 1, wherein the operating a normal line to a surface of the three-dimensional object includes operating the normal line to the surface of the three-dimensional object by providing a first light source for emitting light rays in a first direction crossing at a right angle with an eyes line direction of the predetermined viewpoint and a second light source for emitting light rays in a second direction crossing at a right angle with the eyes line direction of the predetermined viewpoint, irradiating the light rays emitted from the first light source and the light rays emitted from the second light source to the three-dimensional object, executing predetermined rendering processing on the basis of the predetermined viewpoint, and generating a normal image expressing the normal line to the surface of the three-dimensional object in color information, the setting a plurality of sampling points includes setting the plurality of sampling points in the normal image generated, and the rendering the three-dimensional object includes rendering the three-dimensional object by performing the processing for determining the arrangement angle of the predetermined brush image on the basis of the color information of each of the plurality of sampling points, and arranging the predetermined brush image at the arrangement angle determined at the position corresponding to each of the plurality of sampling points in the rendering buffer.

3. The image generating method as claimed in claim 2, wherein the rendering buffer is formed so as to store RGB values for every pixel,
the generating a normal image includes generating the normal image by setting a light ray color of the first light source to be a first color of RGB and a light ray color of the second light source to be a second color of the RGB other than the first color, executing the predetermined rendering processing, and operating the RGB values of each of pixels of the surface of the three-dimensional object, and
the determining the arrangement angle of the predetermined brush image includes determining the arrangement angle of the predetermined brush image at each of the plurality of sampling points by operating a direction corresponding to the normal line of each of the plurality of sampling points, on the basis of a value of the light ray color of the first light source and a value of the light ray color of the second light source of the RGB values of the normal image.

4. The image generating method as claimed in claim 2, further comprising setting a light source in an object space in which the three-dimensional object is provided,
wherein the determining the arrangement angle of the predetermined brush image includes determining the arrangement angle of the predetermined brush image by synthesizing a light ray direction of the light source set with a direction of the normal line operated.

5. The image generating method as claimed in claim 2, further comprising operating a direction from a predetermined position of the normal image generated to each of the plurality of sampling points,
wherein the determining the arrangement angle of the predetermined brush image includes determining the arrangement angle of the predetermined brush image by synthesizing the direction operated with a direction determined on the basis of the color information of the normal image.

6. The image generating method as claimed in claim 4, further comprising operating a direction from a predetermined position of the normal image generated to each of the plurality of sampling points,
wherein the determining the arrangement angle of the predetermined brush image includes determining the arrangement angle of the predetermined brush image by synthesizing the light ray direction of the light source set and the direction operated with angle information determined on the basis of the color information of the normal image.

7. The image generating method as claimed in claim 1, further comprising:
setting a light source in an object space in which the three-dimensional object is provided; and
calculating shadow information of the three-dimensional object by executing predetermined rendering processing based on the predetermined viewpoint and the light source set,
wherein the setting a plurality of sampling points includes setting the plurality of sampling points on the basis of the shadow information calculated.

8. The image generating method as claimed in claim 7, wherein the setting a plurality of sampling points includes setting the plurality of sampling points on the basis of the shadow information so that density of sampling points in a low brightness part is higher than density of sampling points in a high brightness part.

9. The image generating method as claimed in claim 7, wherein the rendering the three-dimensional object includes changing brightness information on the predetermined brush image on the basis of the shadow information calculated.

10. The image generating method as claimed in claim 1, wherein the performing the processing for arranging the predetermined brush image includes performing the processing for arranging the predetermined brush image by writing predetermined color information having brightness adjusted on the basis of brightness information on the predetermined brush image in the rendering buffer.

11. The image generating method as claimed in claim 1, wherein the performing the processing for arranging the predetermined brush image includes performing the processing for arranging the predetermined brush image by writing color information on the surface of the three-dimensional object corresponding to each of the plurality of sampling points, the color information having brightness adjusted on the basis of brightness information on the predetermined brush image in the rendering buffer.

12. The image generating method as claimed in claim 1, wherein the setting a plurality of sampling points includes changing a number of sampling points according to a distance between the predetermined viewpoint and the three-dimensional object.

13. The image generating method as claimed in claim 1, further comprising changing a size of the predetermined brush image according to a distance between the predetermined viewpoint and the three-dimensional object,
wherein the rendering the three-dimensional object includes rendering the three-dimensional object on the basis of the predetermined brush image having the size changed.

14. The image generating method as claimed in claim 1, further comprising:
storing information on a plurality of brush images; and
selecting any one brush image of the plurality of brush images according to a predetermined condition,
wherein the rendering the three-dimensional object includes rendering the three-dimensional object on the basis of the any one brush image selected.

15. The image generating method as claimed in claim 1, wherein the arranging the predetermined brush image includes arranging a predetermined number of brush images so that a part of the predetermined number of brush images is placed on one another in a predetermined direction from the position at which the predetermined brush image is arranged when arranging the predetermined brush image.

16. The image generating method as claimed in claim 15, wherein the arranging the predetermined brush image includes arranging a predetermined number of brush images so that a part of the predetermined number of brush images is placed on one another in a predetermined direction based on the arrangement angle of the predetermined brush image when arranging the predetermined brush image.

17. The image generating method as claimed in claim 1, wherein the setting a plurality of sampling points includes shifting positions of the plurality of sampling points set as time passes, and the rendering the three-dimensional object includes rendering the three-dimensional object on the basis of the positions shifted of the plurality of sampling points.

18. The image generating method as claimed in claim 1, wherein the rendering the three-dimensional object includes rendering the three-dimensional object by shifting the arrangement angle of the predetermined brush image arranged as time passes.

19. A storage medium having information recorded thereon, when the information is loaded onto an operating apparatus, the information making the operating apparatus execute the method as claimed in claim 1.

20. A data signal embodied in a carrier wave, comprising information used for executing the method as claimed in claim 1.

21. A program, when the program is loaded onto an operating apparatus, the program making the operating apparatus execute the method as claimed in claim 1.

22. An image generating apparatus for rendering a three-dimensional object viewed from a predetermined viewpoint by generating an image of the three-dimensional object and writing color information on the image generated in a rendering buffer, the apparatus comprising:

a normal line operation section for operating a normal line to a surface of the three-dimensional object;

a sampling point setting section for setting a plurality of sampling points within a rendering region for the three-dimensional object, the rendering region on which the three-dimensional object is projected on the basis of the predetermined viewpoint; and a rendering section for rendering the three-dimensional object by performing processing for determining an arrangement angle of a predetermined brush image on the basis of the normal line operated by the normal line operation section at a position on the surface of the three-dimensional object, the position corresponding to each of the plurality of sampling points, and arranging the predetermined brush image at the arrangement angle determined at the position corresponding to each of the plurality of sampling points in the rendering buffer.

* * * * *